United States Patent [19]

Kinugasa et al.

[11] Patent Number: 5,060,074
[45] Date of Patent: Oct. 22, 1991

[54] VIDEO IMAGING APPARATUS

[75] Inventors: Toshiro Kinugasa, Hiratsuka; Takuya Imaide, Yokohama; Naoki Yamamoto, Yokohama; Hiroyuki Komatsu, Yokohama, all of Japan

[73] Assignees: Hitachi, Ltd., Tokyo; Hitachi Video Engineering, Inc., Yokohama, both of Japan

[21] Appl. No.: 595,364

[22] Filed: Oct. 10, 1990

[30] Foreign Application Priority Data

Oct. 18, 1989 [JP] Japan .................................. 1-268898
Nov. 6, 1989 [JP] Japan .................................. 1-287453
Dec. 22, 1989 [JP] Japan .................................. 1-331350

[51] Int. Cl.⁵ ........................................... H04N 5/228
[52] U.S. Cl. ...................................... 358/224; 358/222
[58] Field of Search ................. 358/224, 222, 105, 108

[56] References Cited

U.S. PATENT DOCUMENTS

| | | | |
|---|---|---|---|
| 4,418,360 | 11/1983 | Glasgow | 358/222 |
| 4,527,201 | 7/1985 | Cappels | 358/224 |
| 4,589,031 | 5/1986 | Tsuji | 358/224 |
| 4,599,653 | 7/1986 | Kimura et al. | 358/224 |
| 4,660,092 | 4/1987 | Nutting | 358/224 |
| 4,717,958 | 6/1988 | Gal et al. | 358/222 |
| 4,794,459 | 12/1988 | Moberg et al. | 358/224 |

Primary Examiner—Stephen Brinich
Attorney, Agent, or Firm—Antonelli, Terry, Stout & Kraus

[57] ABSTRACT

A video imaging apparatus changes an area of an imaging element (CCD or MOS type) from which a signal is read out as a TV signal. A normal transfer speed is used to read out the signal from the area as the TV signal and a high transfer speed is used to read out a signal from other area so that smooth movement of an image can be attained.

Further, when movement of a video camera occurs, the movement can be judged by observation through a view finder, that is, which partial area of the whole area of the imaging element is produced as the TV signal can be recognized.

22 Claims, 22 Drawing Sheets

HORIZONTAL IMAGE ROOM AREA
LIGHT RECEIVING PLANE 401 OF IMAGING ELEMENT
TV SIGNAL AREA 402
EXTRA VERTICAL PIXEL AREA
BEFORE MOVEMENT

AFTER MOVEMENT 1

MONITORING PICTURE

AFTER MOVEMENT 2

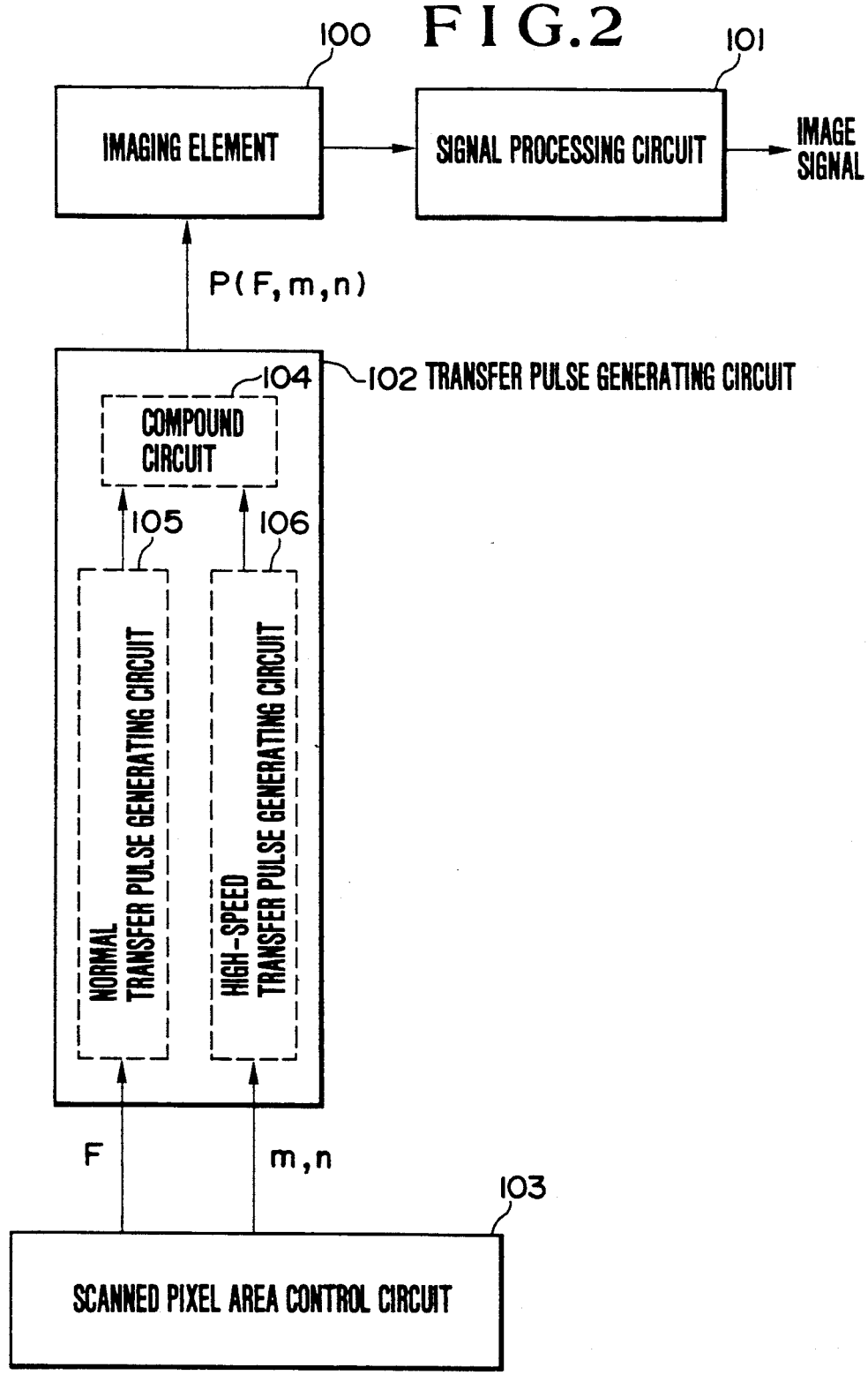

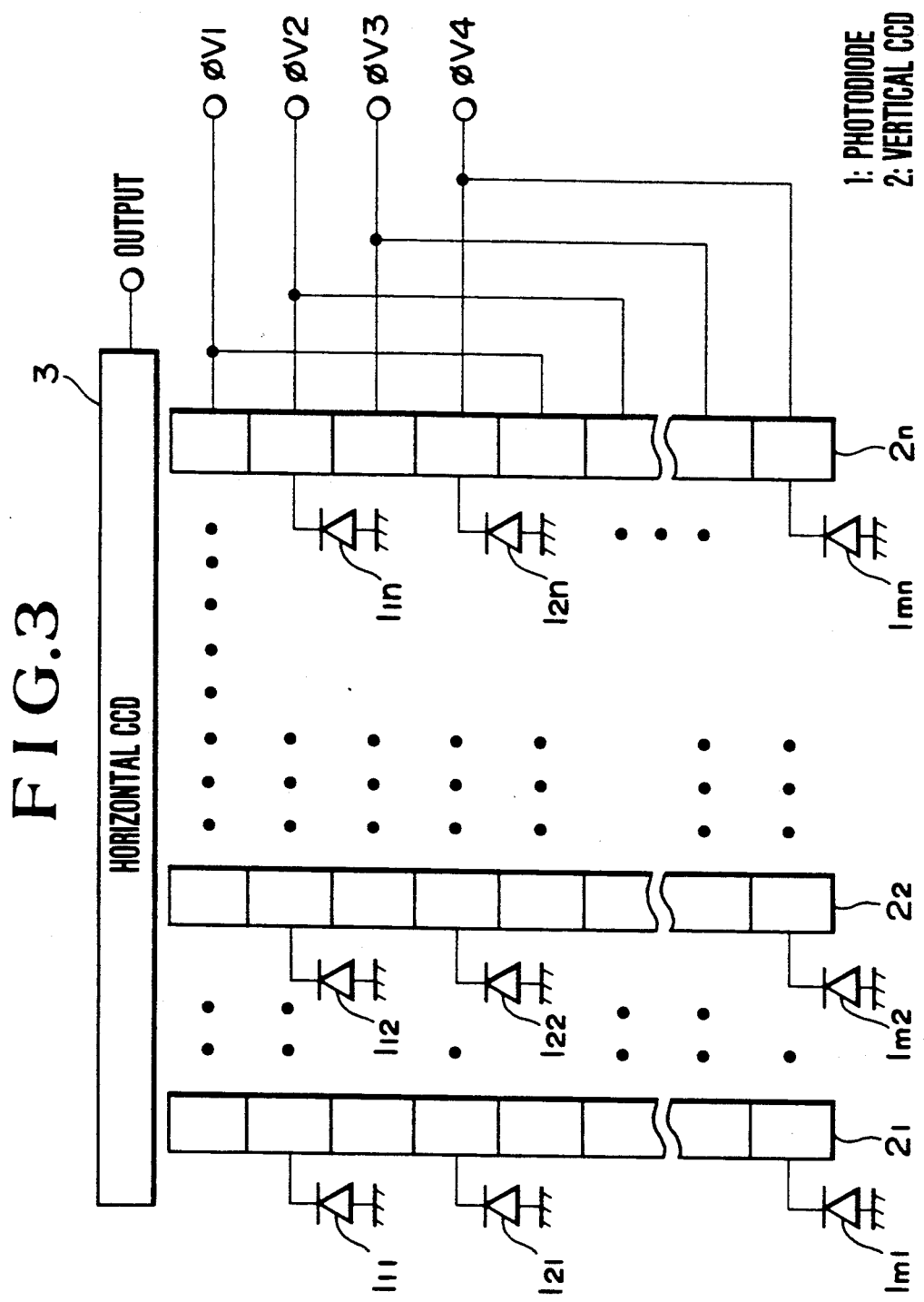

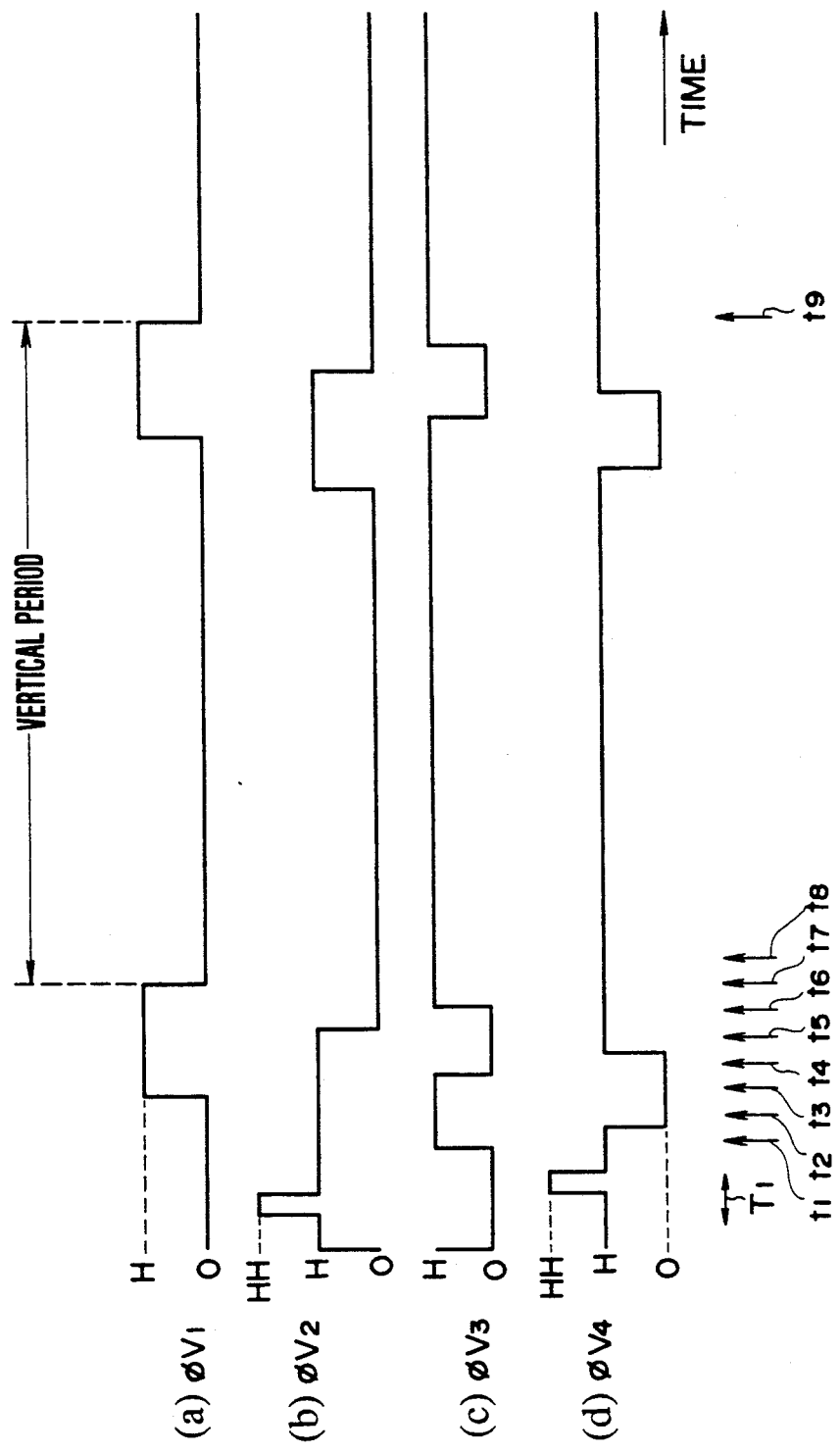

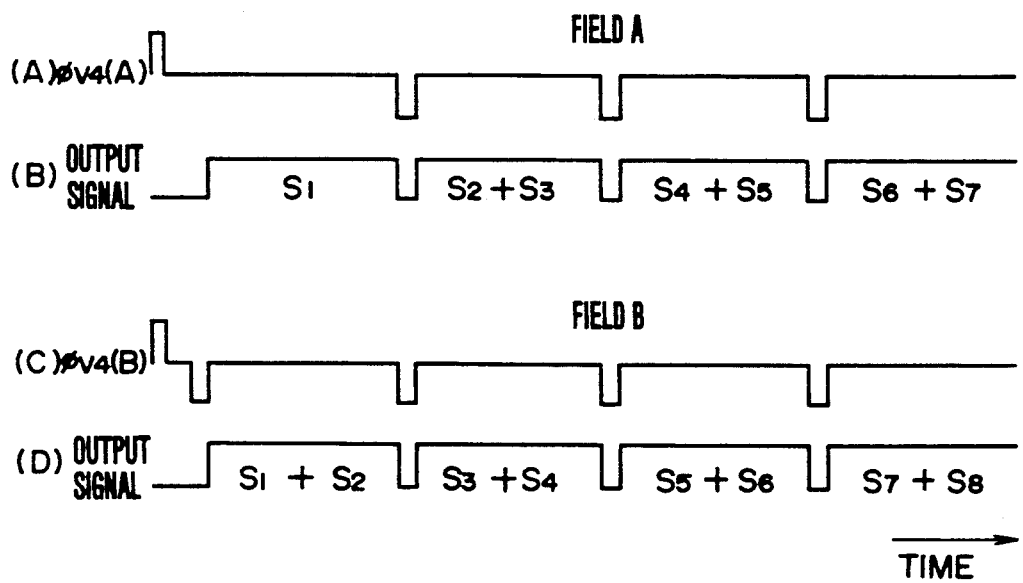
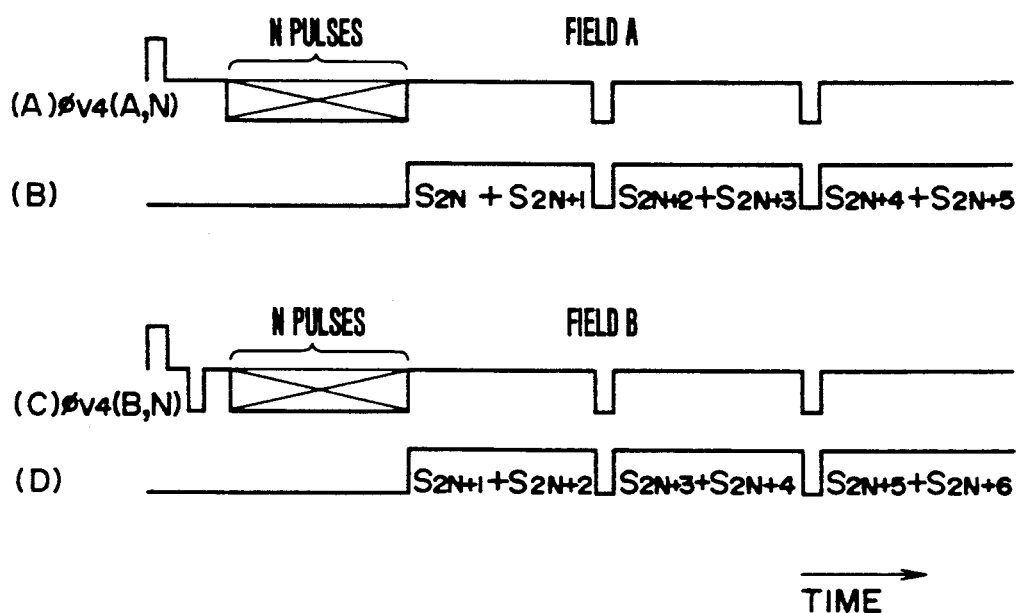

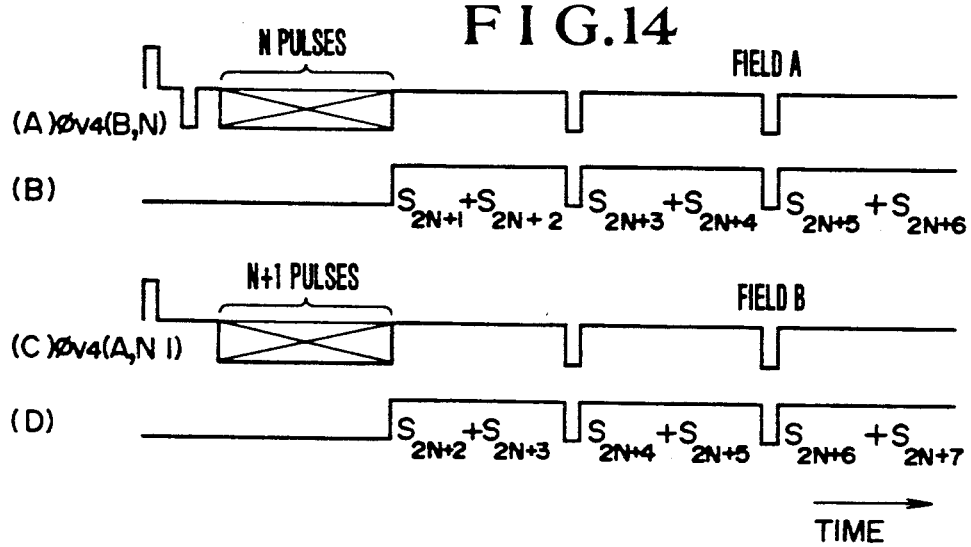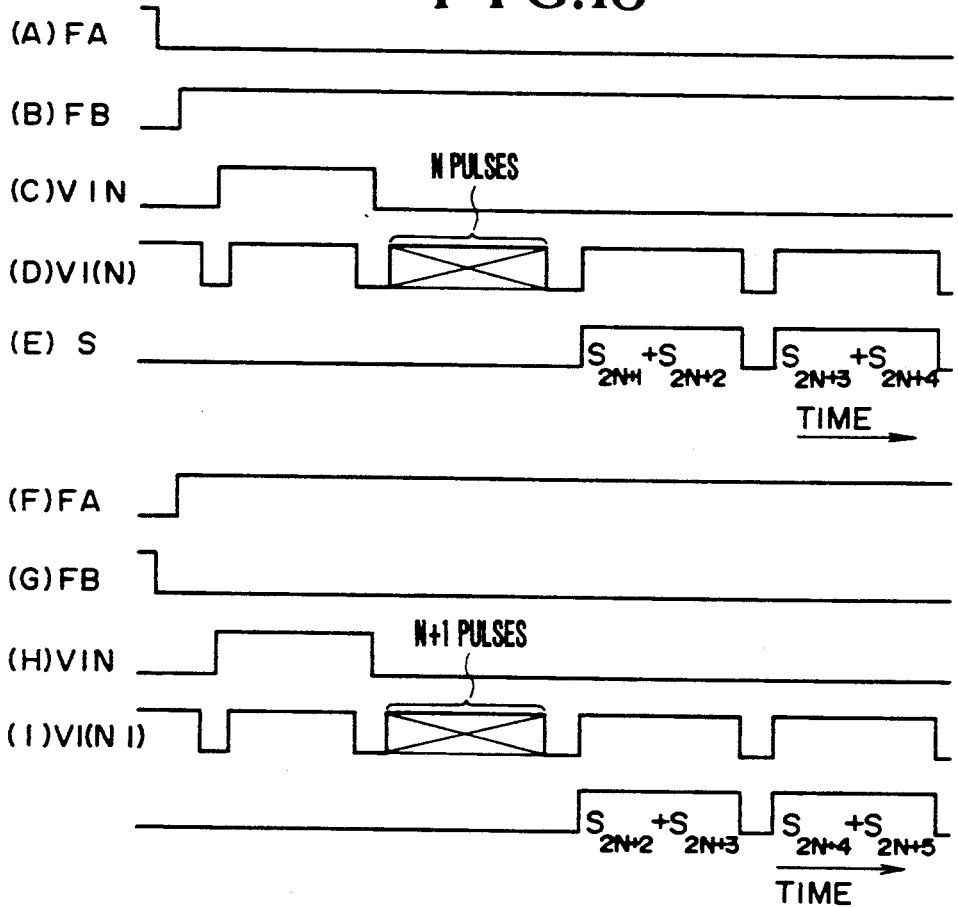

FIG.15
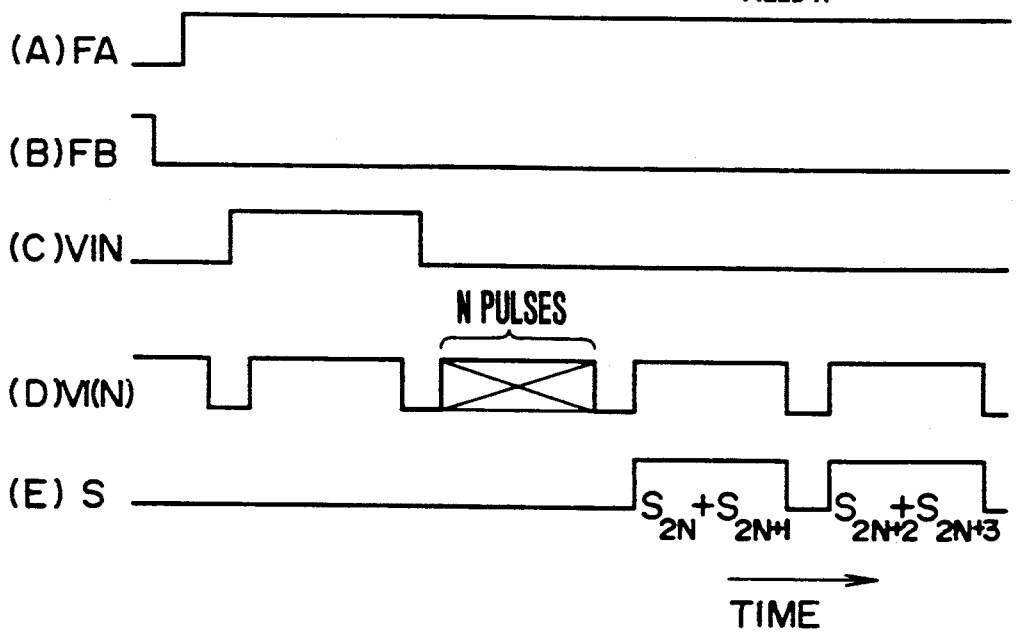
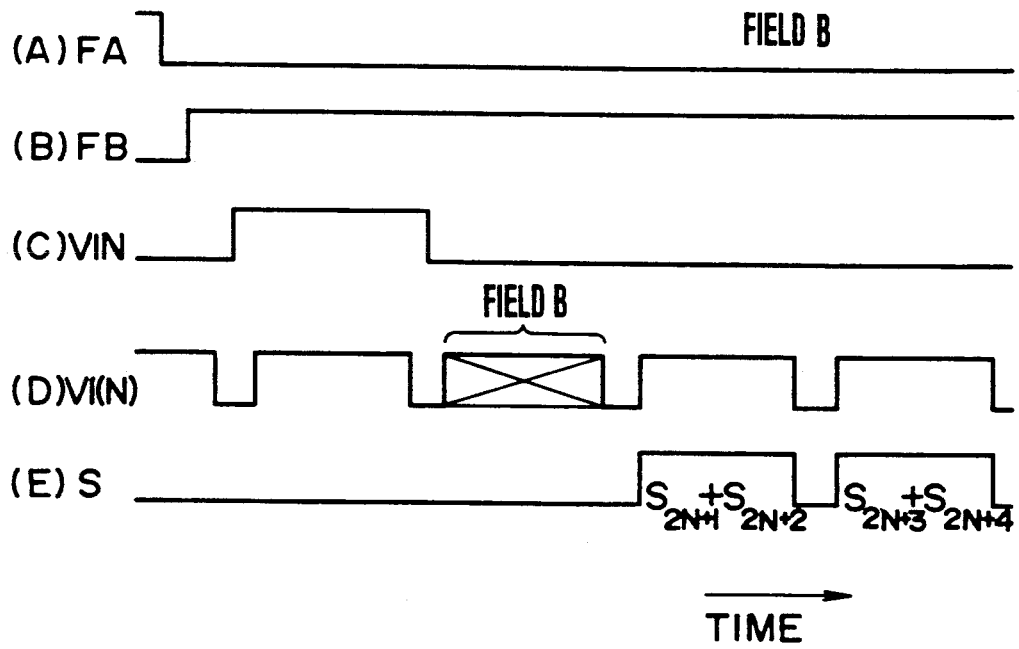

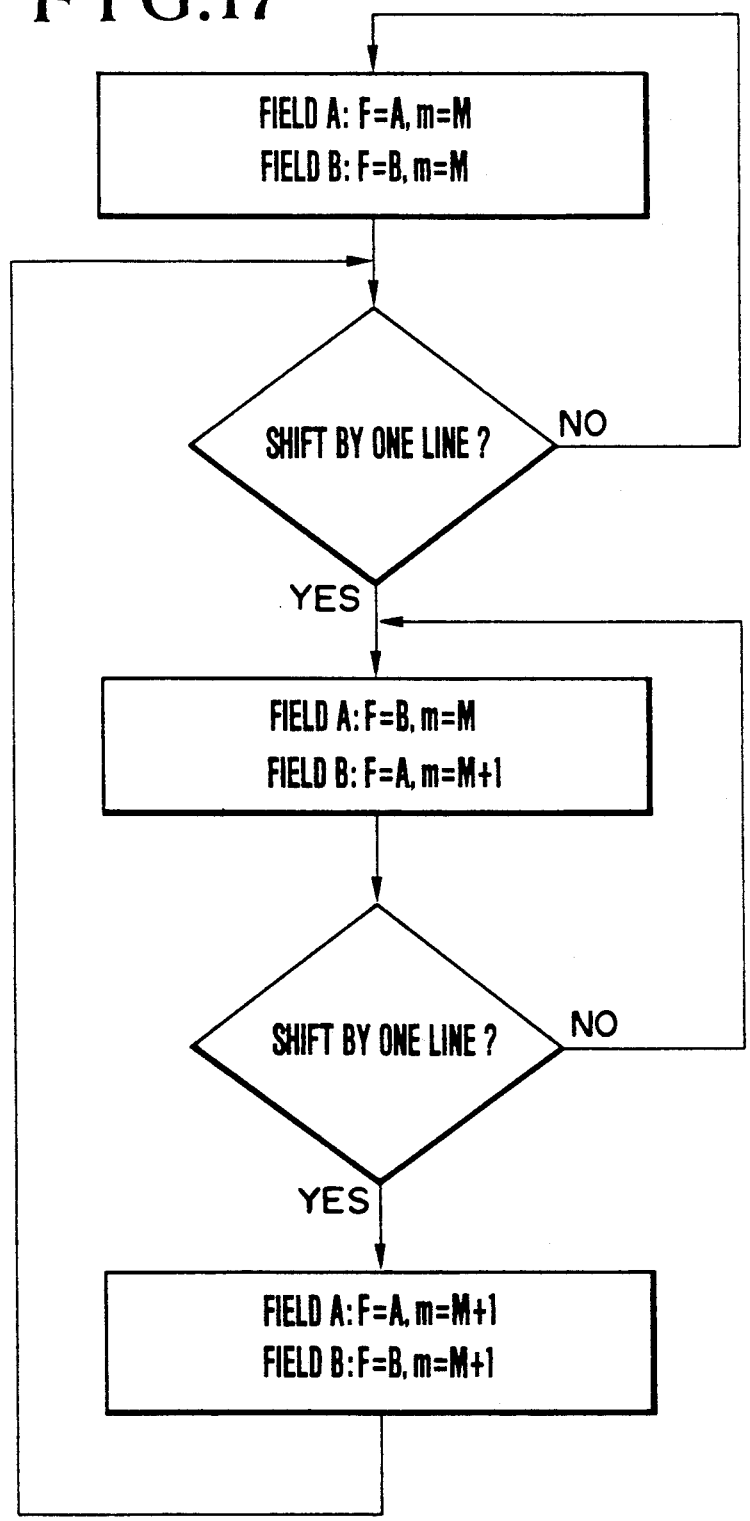

F I G.18
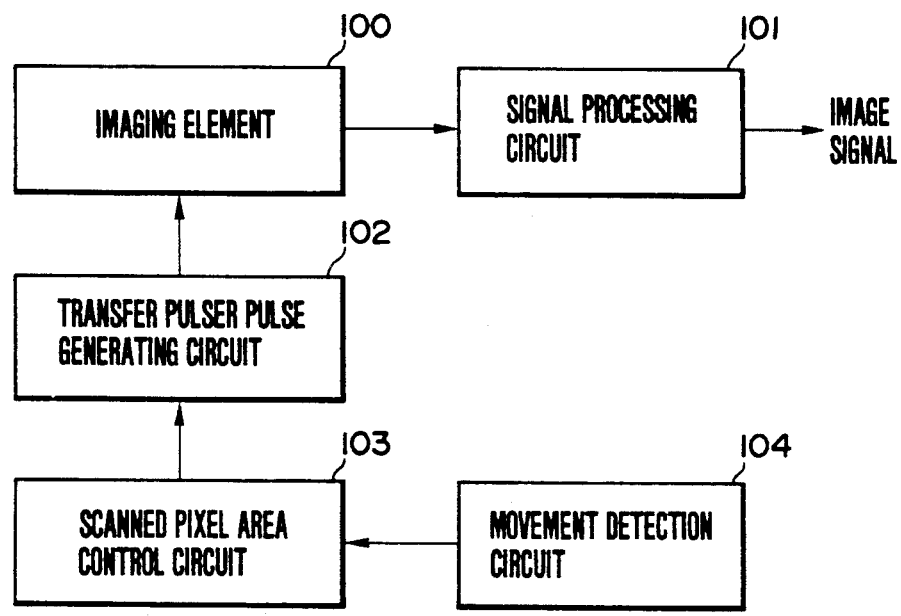
F I G.19
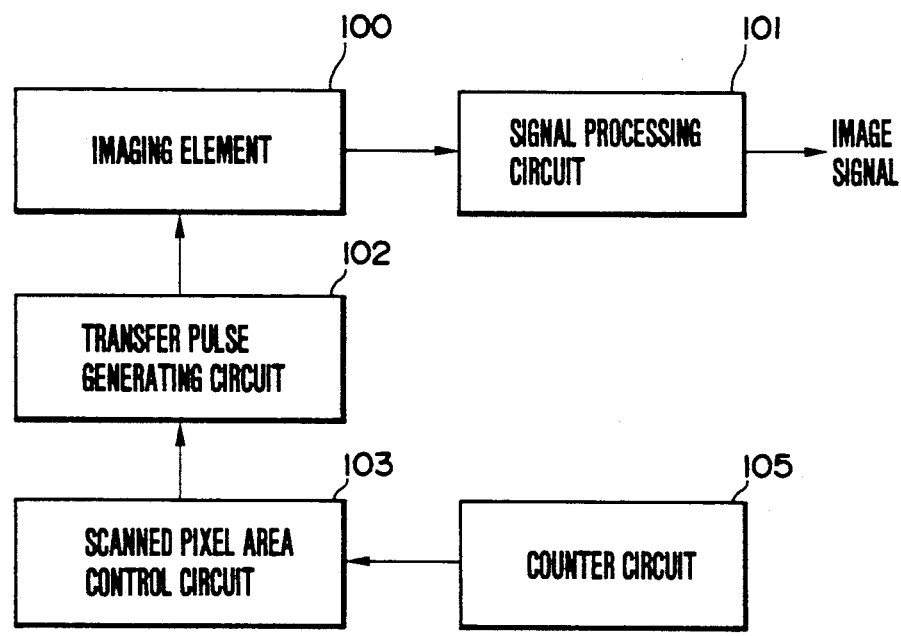

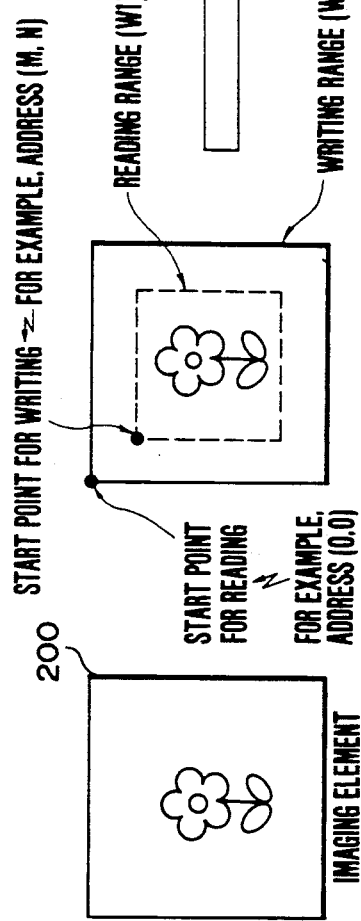
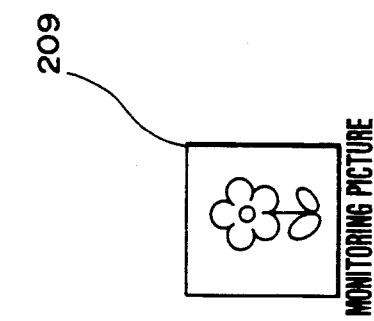
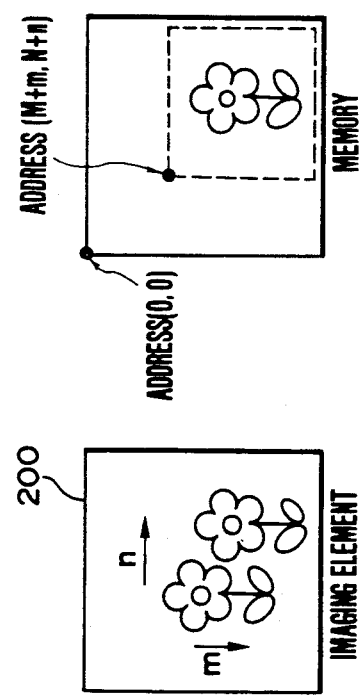
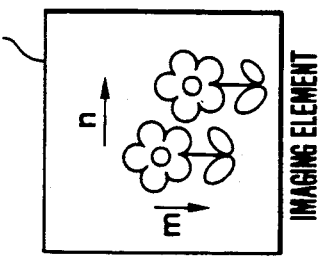

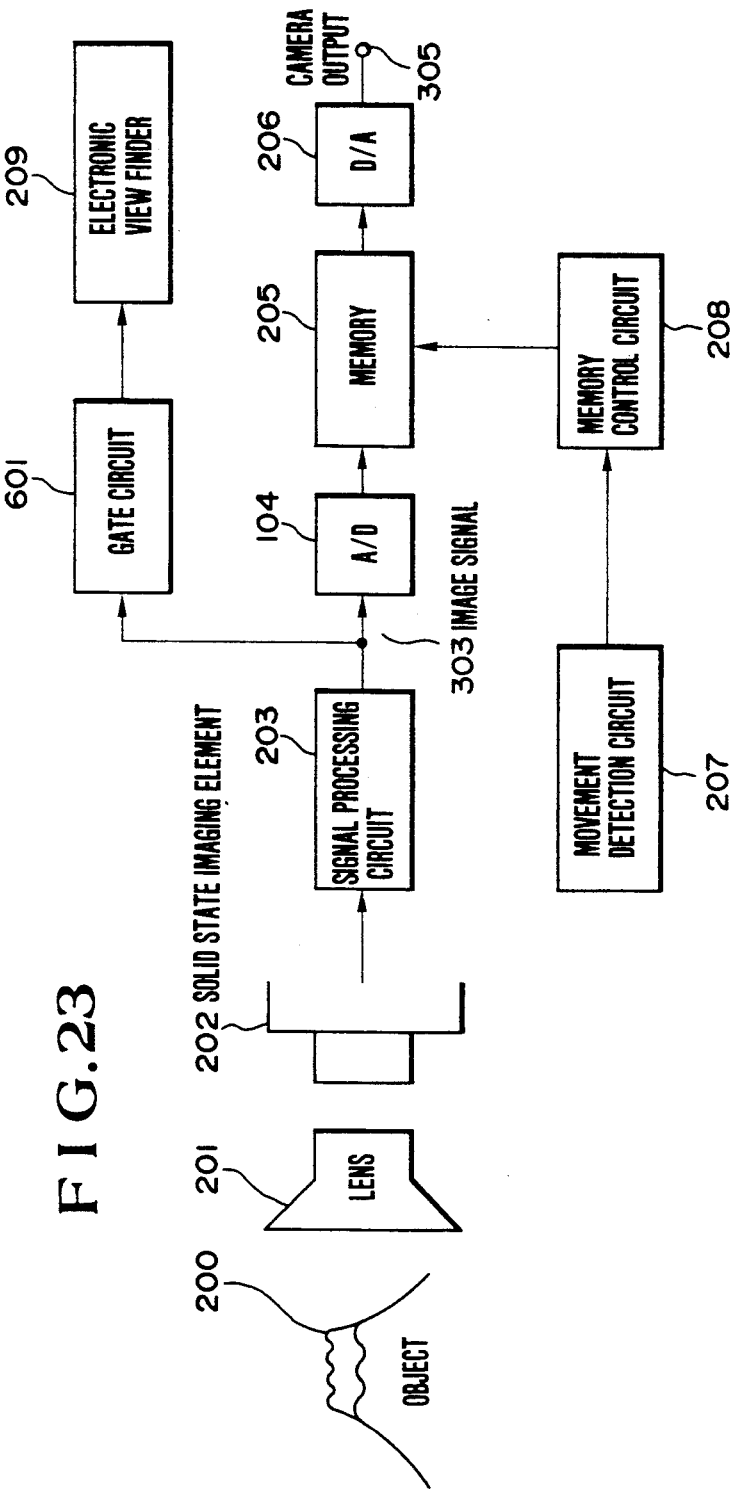

VIDEO IMAGING APPARATUS

BACKGROUND OF THE INVENTION

The present invention relates to a video imaging apparatus, and more particularly to an imaging apparatus characterized by varying an area from which a signal of an imaging element is read out.

Further, the present invention relates to a video camera using a solid state imaging element, and more particularly to a method of monitoring a current imaging condition when movement of a camera is prevented electronically.

Recently, an imaging apparatus is made small in size and light in weight and the magnification of a zoom lens tends to be increased. Thus, when a picture is taken by hand, the picture tends to be blurred by movement of the hands. As a prior art for suppressing the movement of the picture, there is known a method described in Japanese Patent Publication Nos. 1-53957 and 2-32831. In this prior art method, a movement of an imaging apparatus is detected by a rotating gyroscope. An optical system including from a lens to the imaging apparatus is moved on the basis of the detected result, or a transfer of a signal from an imaging apparatus is divided into a high speed transfer and a normal transfer to control the number of signals to be transferred in the high speed transfer. The latter is characterized in that an apparatus therefor can be made small in size.

However, the above prior art method does not considered that two pixels in the vertical direction of the imaging element are read out simultaneously. This simultaneous reading of two rows is an indispensable method necessary to eliminate a remaining image of a frame. When the number of signals to be transferred is increased or decreased while reading two pixels simultaneously, the transfer can be usually made only in a unit of two-pixel pitch even if an area of pixels to be transferred is minimum. Accordingly, a picture having a suppressed movement of an image is moved awkwardly.

In addition, recently, with the development of small and light household video cameras and high magnification of lenses, a video camera having less movement of an image without use of a tripod is highly desired.

As means for correcting the movement of the image, a method using an image memory is known, for example, as described on pages 377 to 378 in a collection of preprints for Lectures in a National Convention of the Institute of Television Engineers of Japan (1987). In this method, movement and vibration of a picture due to movement of a camera are detected as a parallel movement amount of the picture to calculate a correction amount on the basis of an amount and a direction of the parallel movement, that is, a vector so that the image is moved by the correction amount through the image memory to correct the movement and vibration of the picture.

As methods of correcting (preventing) the movement of the hands in the photography by a camera, there are the mechanical method using the gyroscope or the like as described in Japanese Patent Unexamined Publication No. 60-14330 described above and the electrical method of correcting the movement of the hands by using the image memory to devise the special processing of signals and the reading method of an imaging element. The latter has an image memory or an imaging element providing an image signal for a wider area than an area from which a TV signal is produced and selects a proper area in the whole area to produce the image signal in the selected area as the TV signal. Accordingly, even if movement of the hands occurs and the angle of field of the image memory or the imaging element is varied, the image signal in the same area as that before the occurrence of the movement of the hands is produced as the TV signal so that the TV signal having the same angle of field before and after the movement of the hands is obtained to thereby correct the movement of the hands.

In a camera which corrects movement of the hands electrically, for example, as shown in FIG. 1A, when an area of a light receiving plane 401 of an imaging element has an image room of 10% in the vertical and horizontal directions as compared with an area from which the TV signal is produced, movement of the hands up to 5% in the vertical and horizontal directions can be corrected as shown in FIG. 1B (in the case where the center of the TV signal before the movement of the hands is the same as the optical center of the imaging element).

As shown in FIG. 1C, when the TV signal area 402 is deviated or moved up due to the movement of the hands to come into contact with an upper edge of the light receiving plane 401, there is no room for correcting the upward movement of the hands and the upward movement of the hands can not be corrected.

As described above, even if the movement of the hands occurs as shown in FIGS. 1B and 1C, the image in the TV signal area 402 is not changed by the correction of the movement.

The area 402 is observed through a view finder as a monitoring picture. Accordingly, there is an disadvantage that it is impossible to determine whether the movement of a camera occurs or not as far as the area is observed through the view finder.

SUMMARY OF THE INVENTION

It is an object of the present invention to move in a pitch of one pixel an area of pixels to be normally transferred while reading out two rows simultaneously so that an image is moved smoothly.

In order to achieve the above object, there are provided an imaging element, a scanning pulse generating circuit for supplying a scanning pulse for transfer of a signal to the imaging element and a scanned pixel area control circuit for supplying a control signal to the scanning pulse generating circuit, whereby a combination of two pixels adjacent to each other in the vertical direction which are read out simultaneously by the control signal is gradually shifted in a pitch of one pixel.

When the combination of two pixels adjacent to each other in the vertical direction which are read out simultaneously is gradually shifted, the area of the pixels to be normally transferred can be moved in a pitch of one pixel and accordingly the image is moved smoothly.

It is another object of the present invention to provide a video camera apparatus having a correction function of movement of a camera which solves the problems in the prior art and is used and operated easily and simply by producing an image, which is not subjected to correction, to an electronic view finder upon photographing and producing an image signal, which is subjected to correction, to a VTR.

The above object is achieved by using a solid state imaging element with pixels having a row in the number thereof in the horizontal and vertical direction and providing means for reading out the whole pixels and extracting only necessary portion of the image signal which has been subjected to signal processing and does not pass through an image memory to produce the extracted image signal to the electronic view finder.

Observation of uncorrected image can correct the movement of a camera while monitoring a natural image so that a camera work having reduced movement of the image without use of a tripod can be attained.

It is a further object of the present invention to reduce an error in correction of movement of the hands by giving information as to which portion in the whole area of an image memory or imaging elements is produced as a TV signal to a photographer.

The above object is achieved by the provision of a circuit for calculating an optical center in a light receiving plane of the image memory or imaging elements to display it.

Further, the above object is also achieved by displaying the whole area in a view finder and superposing information such as a boundary line between a portion produced as the TV signal and a portion not produced as the TV signal.

The optical center of the whole area of the image memory or the imaging elements is calculated and displayed in the finder in which a portion of the whole area of the image memory or the imaging elements is displayed. Thus, since the photographer can move the center of the angle of field of an object in the finder to the center of the whole area of the image memory or the imaging elements consciously, the movement of the hands in the vertical and horizontal directions can be corrected uniformly and a correction error can be reduced. Further, the whole area of the image memory or the imaging elements is displayed in the finder and the boundary line is provided between the portion produced as the TV signal and the portion not produced as the TV signal to thereby attain the same effect.

BRIEF DESCRIPTION OF THE DRAWINGS

FIG. 2 is a block circuit diagram illustrating a transfer pulse generating system of the present invention;

FIGS. 3, 4, 5, 6 and 7 are waveform diagrams and element configuration diagrams for explaining operation of transferring an image signal in a CCD type imaging element;

FIGS. 12 to 17 are waveform diagrams and a flow chart for explaining the transfer operation of FIG. 2;

FIGS. 18 and 19 are block circuit diagrams for explaining operation of other embodiments of the present invention, respectively;

FIGS. 21A, 21B, 22A and 22B illustrate states of image signals in each portion of the embodiment of FIG. 20;

FIG. 23 is a block circuit diagram showing other embodiment different from the embodiment shown in FIG. 20;

DESCRIPTION OF THE PREFERRED EMBODIMENT

Figure 1A:
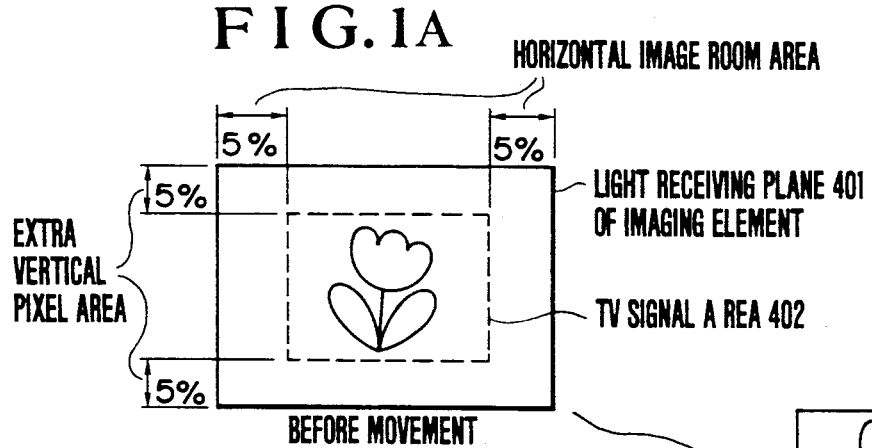
FIGS. 1A to 1D are drawings for explaining a conventional correction method of movement of the hands in a video camera.
Figure 1B:
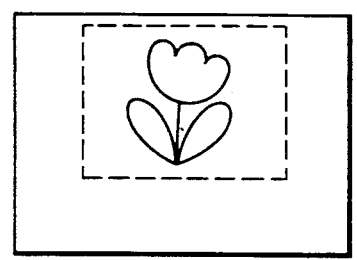
Figure 1D:
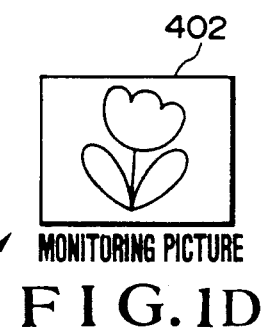
Figure 1C:
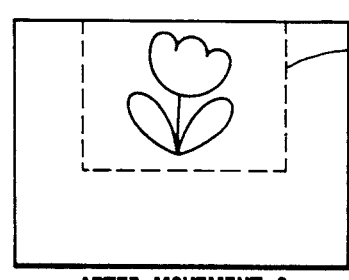

An embodiment of the present invention is now described with reference to FIG. 2. In FIG. 2, reference numeral 100 denotes an imaging element, 101 a signal processing circuit, 102 a transfer pulse generating circuit, and 103 a scanned pixel area control circuit. Further, the transfer pulse generating circuit comprises a compound circuit 104, a normal transfer pulse generating circuit 105 and a high-speed transfer pulse generating circuit 106 as shown by broken line.

Figure 5:
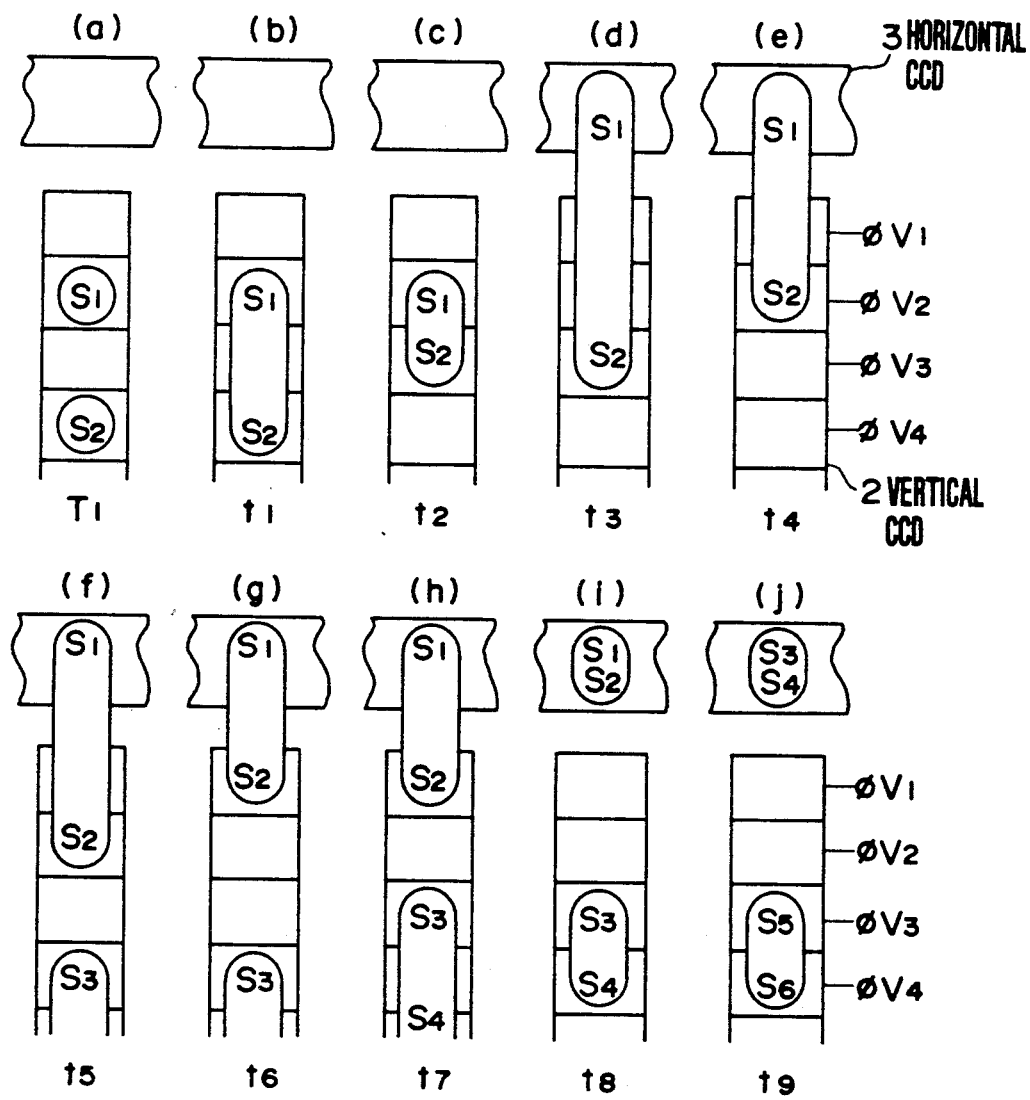
Figure 6:
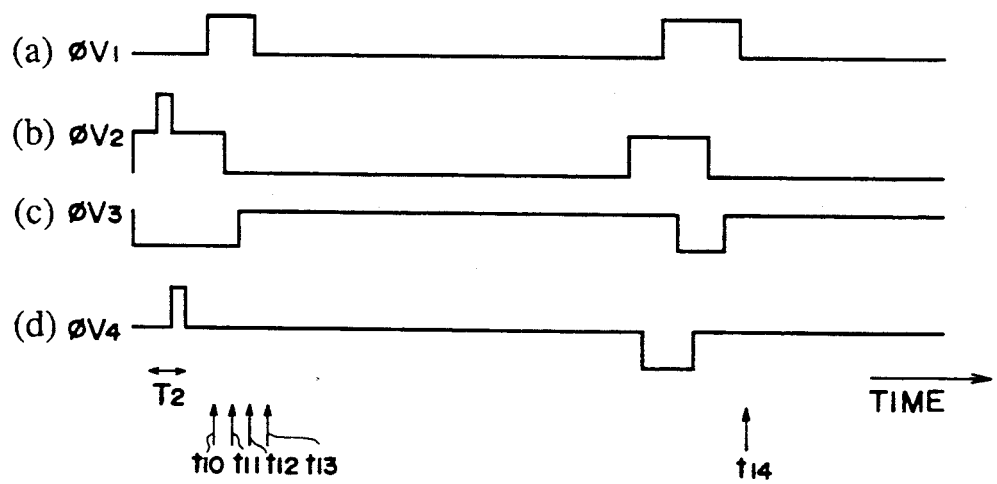
Figure 7:
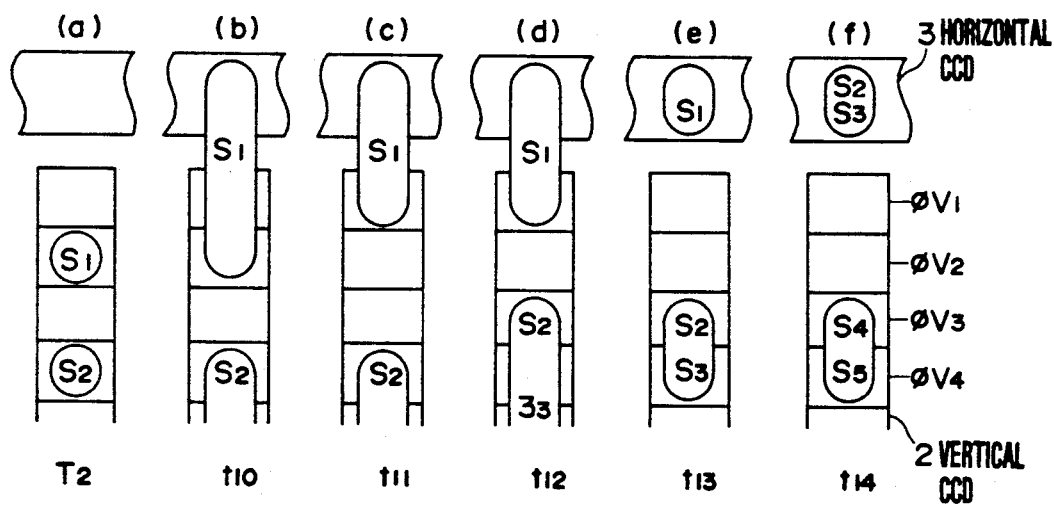

Operation of the imaging element 100 is now described. The imaging element is classified into a CCD type and an MOS type. A representative CCD type imaging element is shown in FIG. 3. In FIG. 3, reference numeral 1 denotes a photodiode, 2 a vertical CCD, and 3 a horizontal CCD. The photodiodes 1 are arranged into m rows and n columns and suffixes of the numeral 1 for the photodiodes represent the numbers of the row and the column. Electric charges of signals stored in the photodiodes 1 are transferred to the vertical CCD's 2 in response to transfer pulses $\phi_{V1}$ to $\phi_{V4}$ and further transferred to the horizontal CCD 3 to be produced in response to horizontal transfer pulses not shown. The transfer operation of signals in the case where two rows of the photodiodes are read out simultaneously is described with reference to FIGS. 4 to 7. FIG. 4 is a timing chart of transfer pulses in the case where a signal $S_{2i-1}$ of a photodiode in the (2i-1)th row and a signal $S_{2i}$ of a photodiode in the (2i)th low are read out simultaneously, i represents a natural number. A signal Si is transferred from the photodiodes 1 to the vertical CCD 2 in a period $T_1$ and transferred to the horizontal CCD 3 at time $t_1$ to $t_8$. This operation is shown in FIG. 5. The signals $S_{2i-1}$ and $S_{2i}$ are combined at time $t_1$ and the signals $S_1$ and $S_2$ are transferred to the horizontal CCD 3 until time $t_8$ and read out successively. The transfer is made in the same manner in the next horizontal period and signals $S_3$ and $S_4$ are transferred to the horizontal CCD 3 at time $t_9$. FIG. 6 is a timing chart of transfer pulses in the case where a signal $S_{2i}$ of the photodiode in the (2i)th row and a signal $S_{2i+1}$ of the photodiode in the (2i+1)th row are read out simultaneously. As shown in FIG. 7, the signals are transferred in a combination shifted by one row in respect to the operation of FIGS. 4 and 5 and read out. Normally, the signal transfer shown in FIGS. 4 and 5 are made in an odd field and the signal transfer shown in FIGS. 6 and 7 are made in an even field so that the interlacing operation is made.

Figure 8:
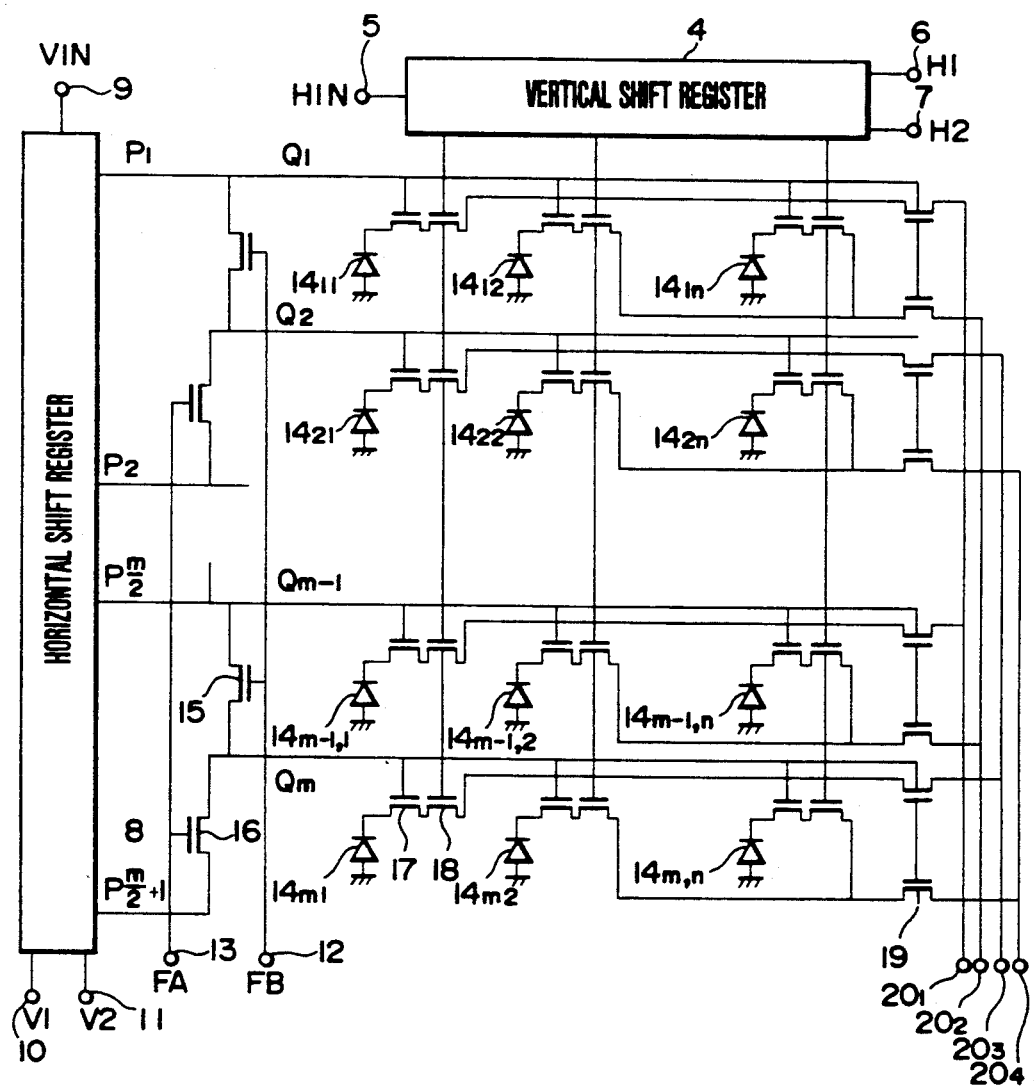
FIGS. 8, 9, 10, and 11 are waveform diagrams and element configuration diagrams for explaining operation of transferring an image signal in an MOS type imaging element.
Figure 9:
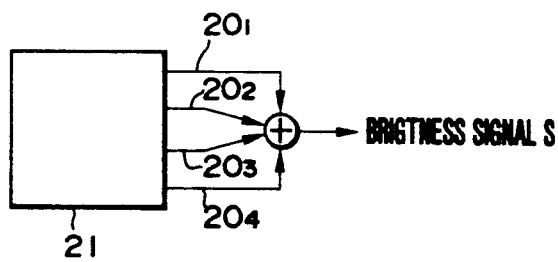

A representative MOS type imaging element is shown in FIG. 8. In FIG. 8, reference numeral 4 denotes a horizontal shift register, 5 a horizontal start pulse (HIN) input terminal, 6 and 7 horizontal clock (H1 and H2) input terminals, 8 a vertical shift register, 9 a vertical start pulse (VIN) input terminal, 10 and 11 vertical clock (V1 and V2) input terminals, 12 and 13 field pulse (FA and FB) input terminals, 14 a photodiode, 15-19 MOS switches, and 20 signal output terminals. A brightness signal is obtained by adding respective output signals as shown in FIG. 9.

Figure 10:
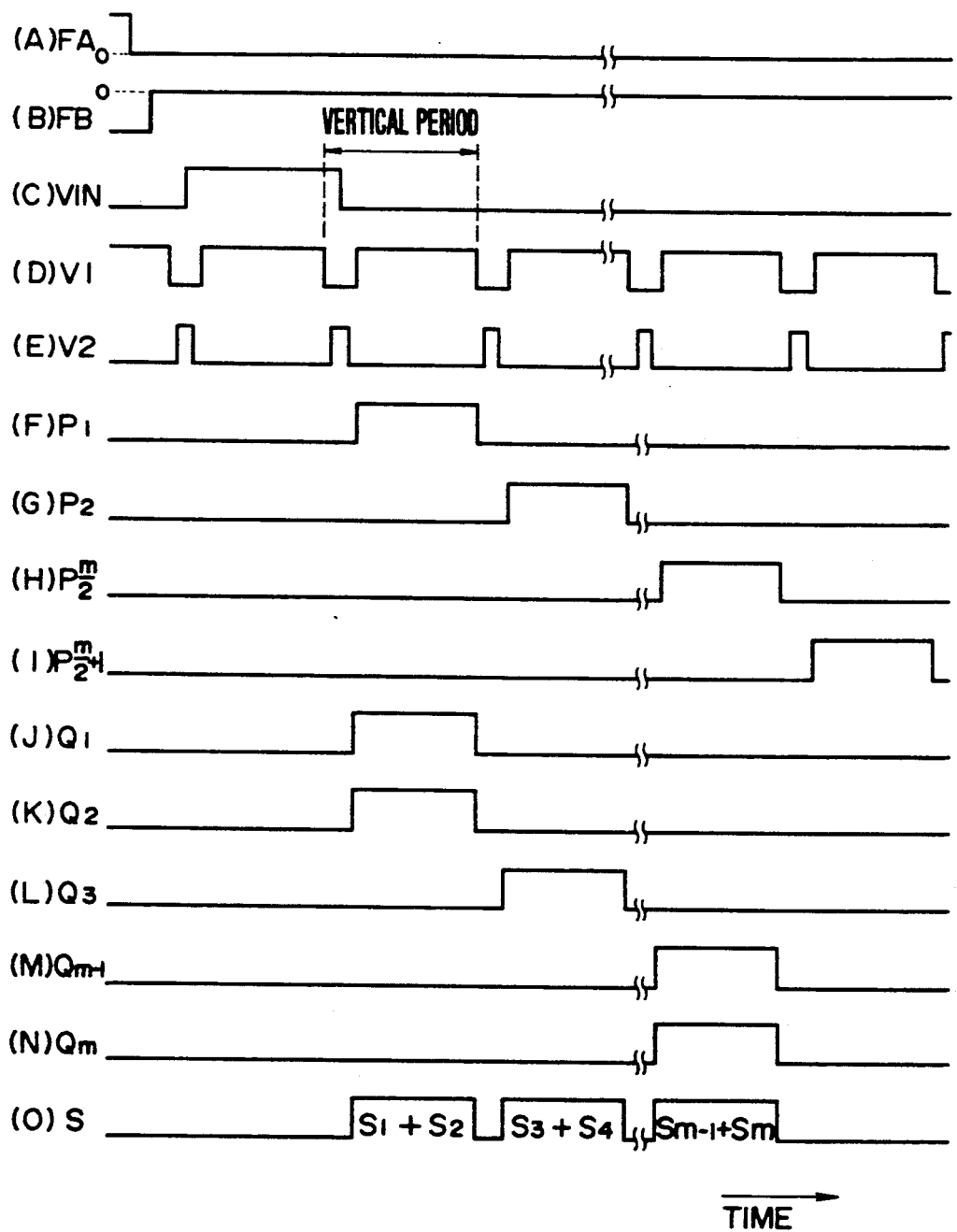
Figure 11:
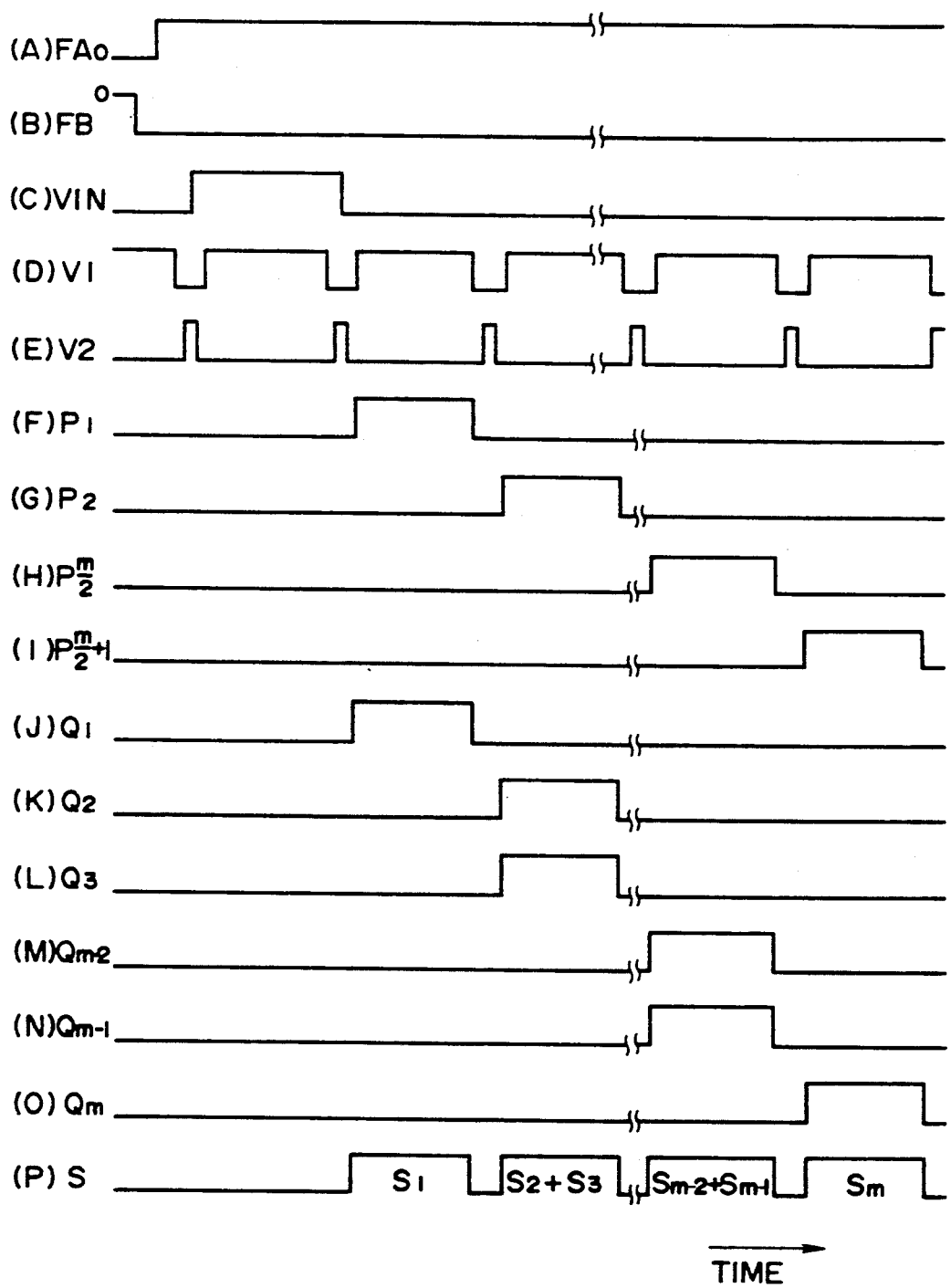

Referring to FIGS. 10 and 11, reading of signals is described. When the vertical start pulse VIN is applied, pulses Pi are produced from the vertical shift register 8 successively in a period of the vertical clocks V1 and V2. The pulses Pi are distributed by the MOS switches 15 and 16 in response to the polarity of the field pulses FA and FB to produce pulses Qi so that the photodiodes 14 in the (2i-l)th row and the (2i)th row are selected simultaneously and signals $S_{2i-l}$ and $S_{2i}$ of the photodiodes 14 in the (2i-l)th row and the (2i)th row are produced out successively in response to pulses (not shown) of the horizontal shift register 4. As shown in FIG. 11, when the polarity of the field pulses FA and FB is reversed, a combination of rows selected by the pulses Qi is shifted by one row so that signals $S_{2i}$ and $S_{2i+l}$ of the photodiodes in the (2i)th row and the (2i+1)th row are produced simultaneously. In the normal reading of the signal, the reading of the signal in FIG. 10 is made in the odd field and the reading of the signal in FIG. 11 is made in the even field so that the interlacing operation is made.

Operation is the case where the high-speed transfer is combined is now described. FIG. 12 shows output signals for the transfer pulse $\phi_{V4}(A)$ of the field A and the transfer pulse $\phi_{V4}(B)$ of the field B in the case where the transfer pulse $\phi_{V4}$ is representative in FIGS. 4 and 5. With transfer pulses $\phi_{V4}(A, N)$ and $\phi_{V4}(B, N)$ obtained by adding N high-speed transfer pulses to the above transfer pulses $\phi_{V4}(A)$ and $\phi_{V4}(B)$, the signals are read out in the normal transfer while shifted by 2N rows as shown in FIG. 13. The scanned pixel area at this time is begun from the 2N'th row. FIG. 14 shows a case where the scanned pixel area is shifted by one row. In the field A of FIG. 14, the same transfer pulses $\phi_{V4}(B, N)$ as those of the field B of FIG. 13 is used to read out signals in a combination shifted by one row. In the field B of FIG. 14, transfer pulses $\phi_{V4}(A, N+1)$ obtained by adding one high-speed transfer pulse to the transfer pulses $\phi_{V4}(A, N)$ of FIG. 13 is used to read out signals in a combination shifted by one row.

Description is now made to the case of the MOS type imaging element. FIG. 15 shows waveforms in reading of the signals in the case where N high-speed pulses are added while pulses FA, FB, VIN and V1 are representative in FIGS. 10 and 11. The scanned pixel area is begun from the 2N'th row by addition of the N high-speed pulses in the same manner as in the CCD type imaging element. FIG. 16 shows a case where the scanned pixel area is shifted by one row. In the field A of FIG. 16, signals are read out in a combination shifted by one row by using pulses of the field B of FIG. 15. In the field B of FIG. 16, signals are read out in a combination shifted by one row by adding one high-speed pulse to the pulses of FIG. 15.

The interlacing operation is not made for the horizontal operation. Accordingly, it is sufficient to simply change the number of pulses to be transferred at a high speed and thus description thereof is omitted.

The foregoing is summarized as follows. The normal transfer pulse control signal F shown in FIG. 2 controls the field in which the normal transfer pulses are supplied to the imaging element 100 and the number of high-speed pulses control signals m and n control the number of high-speed pulses in the vertical and horizontal directions. FIG. 17 shows a flow chart in the case where one row is shifted in one vertical direction. The transfer pulse generating circuit 102 produces the transfer pulses p (F, m and n) in accordance with the flow chart. F represents whether the normal transfer pulse is for the field A or B, and m and n represent the numbers of the high-speed pulses in the vertical and horizontal directions, respectively. In the above description, the case where one row is shifted in one vertical direction has been described, while the shift operation in the opposite direction or by several rows can be made in the case manner. Further, as apparent from the foregoing description, when the scanned pixel area is varied over two fields successively, the normal transfer pulses for the field A or B are supplied to the imaging elements 100 successively.

The changeover of the normal transfer pulses and the changeover of the number of the high-speed transfer pulses are made during the vertical retrace period so that disturbance of an image signal is prevented and accordingly it is desirable that change of the control signals F, m and n are made during the vertical retrace period.

FIG. 18 illustrates an embodiment of suppression of movement of an image. In FIG. 18, reference numeral 104 denotes a movement detection circuit. The movement detection circuit may use an angular velocity sensor to detect the movement of an imaging apparatus, or may detect the movement on the base of the image signal. The movement detection circuit supplies a movement detection signal representative of the direction of movement of the image and the number of pixels over which the image moved to the scanned pixel area control circuit to control the scanned pixel area on the basis of the detection signal.

FIG. 19 illustrates an embodiment in which a picture is scrolled. In FIG. 19, reference numeral 105 denotes a counter circuit. The counter circuit can supply a control signal having a value which is gradually increased or decreased to the scanned pixel area control circuit so that the scrolling that the image gradually goes up and down on a monitoring picture or is gradually moved right and left can be attained smoothly.

As described above, according to the embodiment of the present invention, the area of pixels to be normally transferred, that is, the scanned pixel area can be moved in a pitch of one pixel and accordingly smooth movement of the image can attained.

Another embodiment of the present invention is now described with reference to drawings.

Figure 20:
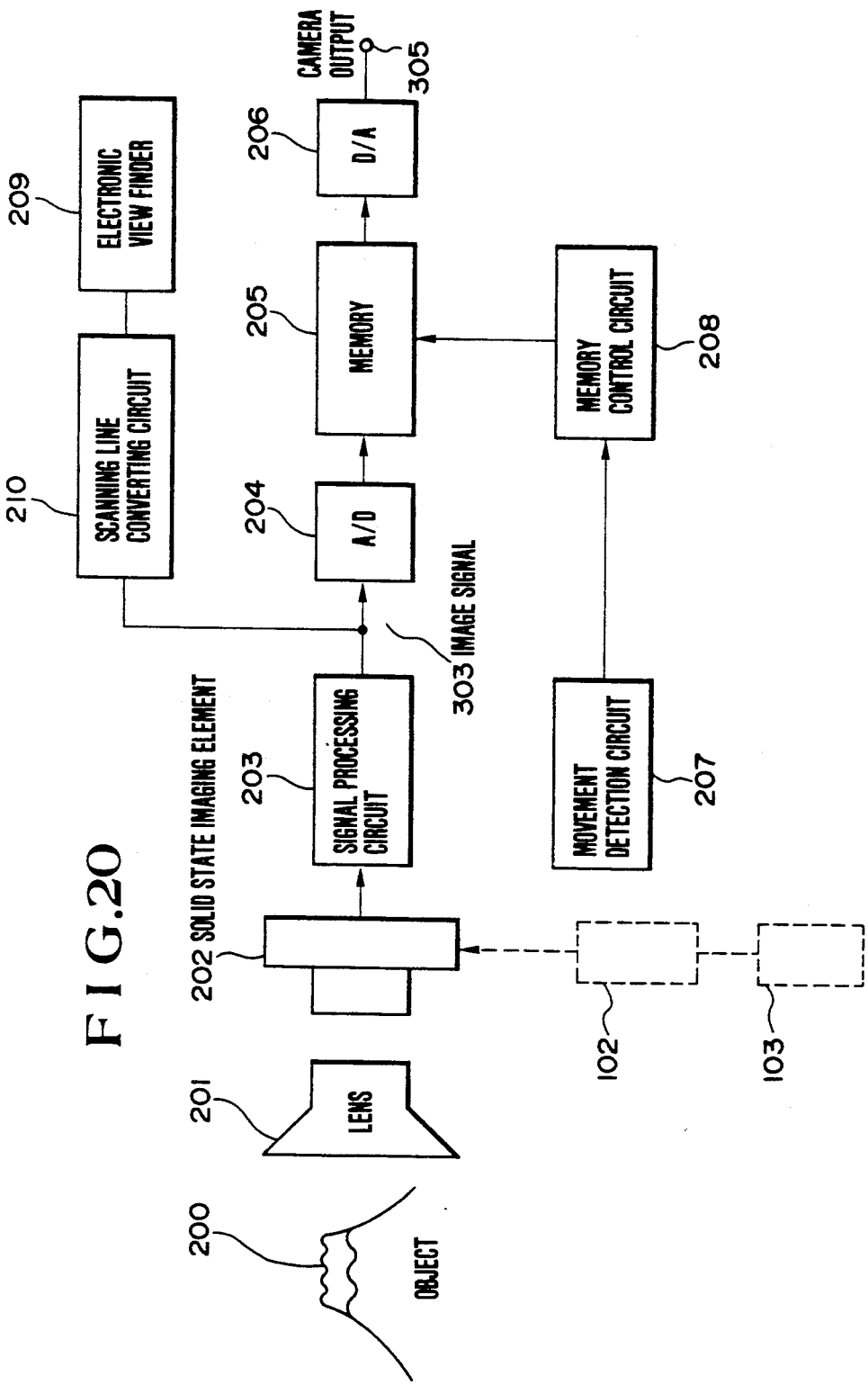
FIG. 20 is a block circuit diagram of a video camera apparatus showing another embodiment of the present invention.

FIG. 20 is a block diagram showing an embodiment of a video camera apparatus according to the present invention. In FIG. 20, reference numeral 201 denotes a lens, 202 a solid state imaging element (hereinafter referred to as an imaging element), 203 a signal processing circuit, 204 an A/D converter, 205 an image memory (hereinafter referred to as a memory), 206 a D/A converter, 207 a movement detection circuit, 208 a memory control circuit for controlling the reading of the memory, 209 an electronic view finder, and 210 a scanning line converting circuit.

The scanning line converting circuit 210 operates as follows. The solid state imaging element 202 has sufficient pixels having a room in the number and accordingly all of pixel signals can not be displayed in the electronic view finder 209 by the scanning line for the standard TV signal (conversely speaking, only part of the pixel signals can be displayed). Thus, for example, TV signals for n lines are produced from the pixel signals for m lines, where m > n (the image is contracted).

The memory control circuit 208 operates as follows. The memory control circuit 208 controls the memory 205 so that all of signals (produced from pixels in the whole area (W)) produced from the solid state imaging element 202 are written int he memory 205 and part (W1) of the written signals is read out form the memory 205 and controls addresses of the memory 205 so that a range of the signals to be read is varied to correct "movement" of a camera.

More particularly, as shown in FIG. 21B, when the image is moved by a m and n in the vertical and horizontal directions, respectively, the starting point of the reading for the memory can be changed from an address (0, 0) to an address (M+m, N+n) to correct the movement of the camera. FIG. 21A shows a case in which there is no movement.

Figure 22A:
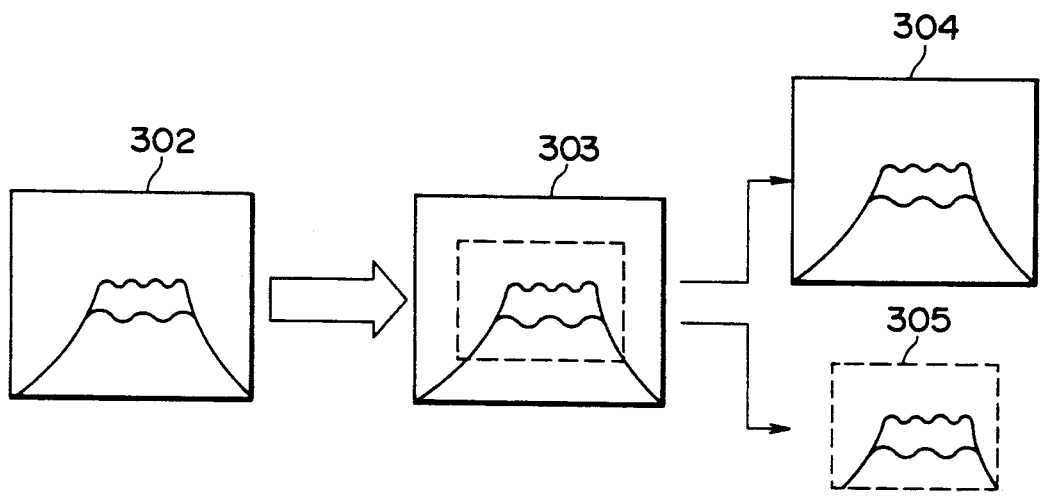
Figure 22B:
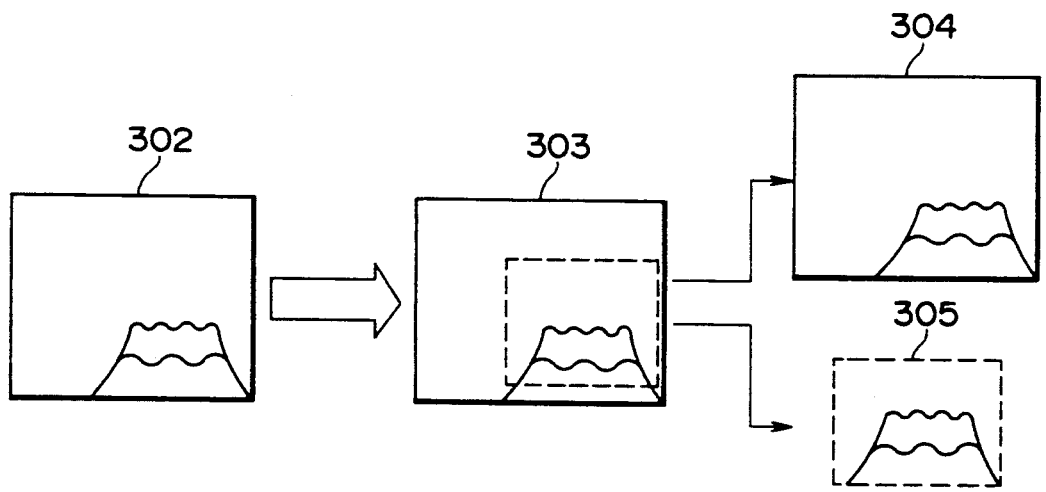

FIGS. 22A and 22B illustrate an image signal 303 after the light receiving plane 302 of the imaging element 202 and the signal processing circuit 203 of FIG. 20, an image 304 of the electronic view finder, and a camera output 305 which is an output after correction of movement of the camera.

In FIG. 20, a light image of an object 200 focused on a light receiving plane of the imaging element 202 through the lens 201 is converted into an electronic signal which is processed by the signal processing circuit 203 which produces an image signal 303. Since the imaging element 202 has sufficient pixels having a room in the number in the horizontal and vertical directions as described above, the image signal 303 has a room in the periphery of the image or the image frame as compared with the standard camera output 305. On the other hand, the movement detection circuit 207 monitors the movement of the camera to supply the movement information to the memory control circuit 208 which produces a memory reading control signal. THe memory control circuit 208 supplies to the memory 205 the memory reading controls signal for moving the start point of the memory reading by the movement opposite to the movement information obtained by the movement detection circuit 207 to correct the movement of the camera.

Further, the image signal 303 produced form the signal processing circuit 203 is supplied to the scanning line converting circuit 210 for converting the number of the scanning lines to be equal to the number of the scanning lines of the standard television signal. The circuit 210 produces the scanning line converted signal to supply it to the electronic view finder 209 to produce an image 304 (refer to FIGS. 22A and 22B).

FIG. 22A illustrates images int he standard state of the present embodiment. The image 304 of the electronic view finder 209 and the camera output 305 have the same image but have different image frames as shown in FIG. 22A. Thereafter, when movement of the camera occurs and the focused image of the object 200 on the light receiving plane 302 of the imaging element is shifted as shown in FIG. 22B, the memory control circuit 208 changes the start point of the reading of the memory on the basis of the movement information from the movement detection circuit 207 to coincide with the image before one field so that the camera output 305 as showing broken line is produced. On the other hand, the electronic view finder 209 is supplied with an uncorrected image signal 303 having the converted number of scanning lines and produces an image shifted in parallel by the same mount as the movement of the camera as shown in solid line by 304 of FIG. 22B.

Thus, the same image as that in the standard state, that is the image having the corrected and small movement of the camera is obtained in the camera output 305 and the image having the uncorrected movement of the camera is obtained in the image 304 of the electronic view finder.

The imaging element 202 is required to have the number of extra pixels which is at least 30 percent larger than the number of the standard pixels.

FIG. 23 is a block diagram of a further embodiment of the present invention. The embodiment constitutes a video camera apparatus which can produce a monitoring image having the same image frame as that of the camera output 305 when an image having uncorrected movement of the camera is monitored.

The embodiment of FIG. 23 has the same configuration as that of the embodiment shown in FIG. 20 except that a gate circuit 601 is provided between the signal processing circuit 203 and the electronic view finder 209.

FIG. 24 illustrates the image on the light receiving plane 302 of the imaging element 202, the image signal 303, and the image 304' of the electronic view finder and the camera output 305' of the electronic view finder and the camera output 3-5' in the same manner as in FIGS. 22A and 22B.

Figure 24A:
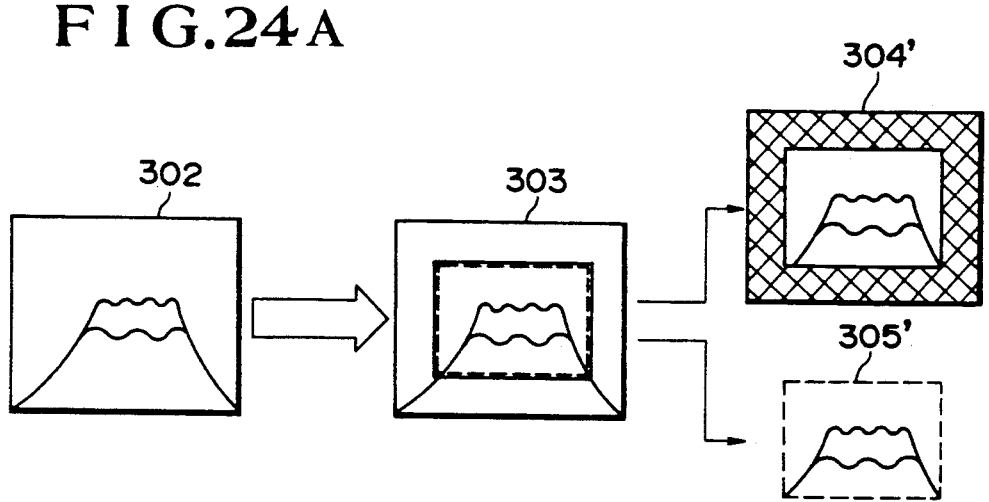
FIGS. 24A and 24B illustrate states of image signals in each portion of the embodiment of FIG. 23.
Figure 24B:
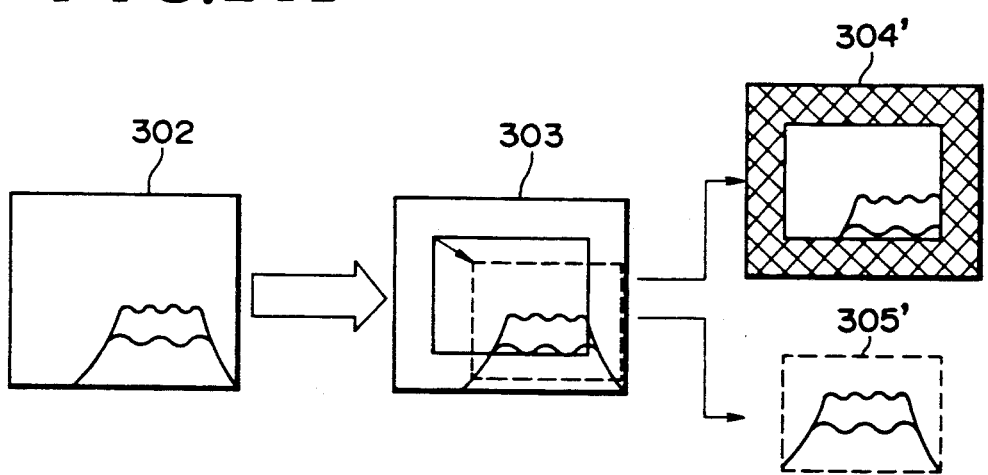

Referring to FIGS. 23, 24A and 24B, operation is now described.

The image output 303 produced from the signal processing circuit 203 has a room in the horizontal and vertical direction in the same manner as in the above-mentioned embodiment and is supplied to the gate circuit 601 in which the image output 303 is subjected top the gating process so that the image thereof is equal to that of the camera output 305'. The image signal gated by the gate circuit is supplied to the electronic view finder 209 so that the image having the same image frame as that of the camera output 305' can be produced as shown by 304' of FIGS. 24A and 24B.

As described above, according to the embodiment the uncorrected image having the same image frame as that of the corrected camera output can be monitored by the electronic view finder 209 while correcting the movement of the camera. As shown in FIGS. 24A and 24B, an outer peripheral portion of the view finder 304' marked with double-hatching is not quite viewed by an observer.

Figure 25:
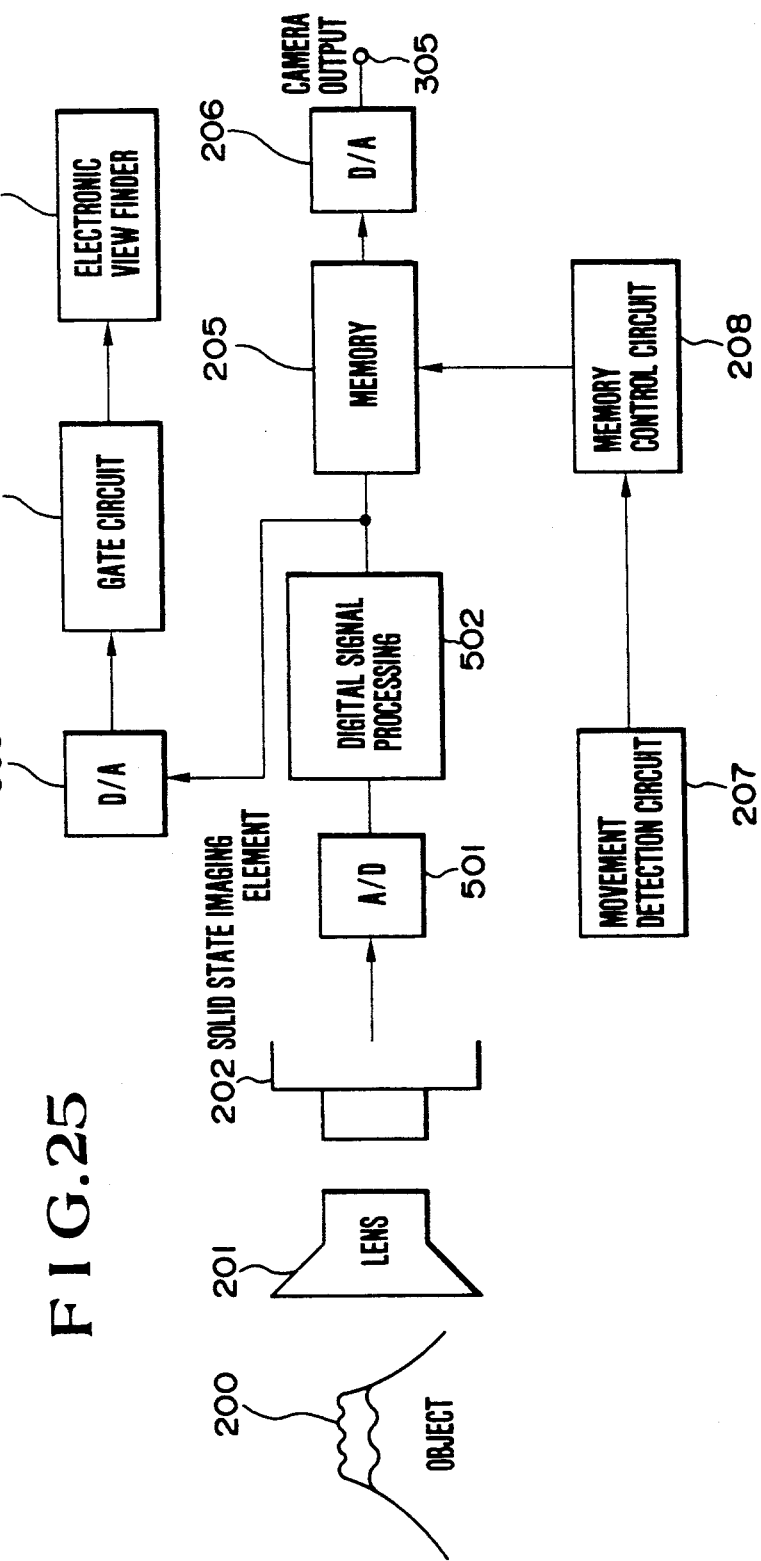
FIG. 25 is a block circuit diagram of other embodiment different from the embodiments shown in FIGS. 20 and 23.

FIG. 25 is a block diagram illustrating a further embodiment of the present invention. The embodiment constitutes a video camera apparatus which monitors an image in correction of movement of the hands in a video camera which obtains an image signal using a digital signal processing.

In FIG. 25, reference numeral 501 denotes an A/D converter, 502 a digital signal processing circuit, and 503 a D/A converter.

In the case manner as in the embodiments, an image signal produced from the imaging element 202 is supplied to the A/D converter 501 to be converted into a digital signal which is supplied to the digital signal processing circuit 502. The digital image signal processed by the digital signal processing circuit 502 is supplied through the memory 205 and the D/A converter 503 tot he gate circuit 601. Thus, the embodiment digitizes the signal processing of the video camera apparatus and performs the same operation as that of the circuit of the embodiment of FIG. 23.

In the embodiment of FIG. 20, the transfer pulse generating circuit 102 and the scanned pixel area control circuit 103 described in FIG. 2 can be combined into the solid state imaging element 203 (FIG. 20) (refer to blocks 102 and 103 shown by broken line of FIG. 20).

As described above, according tot he present invention, in the video camera apparatus having the correction function of the movement of the camera, the imaging can be attained while directly monitoring uncorrected image, instead of imaging while monitoring image having corrected movement of the camera. Thus, there can be provided the video camera apparatus having the excellent function that a photographer can make imaging without preventing correction of the movement of the camera and the effect of correction of the movement of the camera can be attained effectively.

Figure 26:
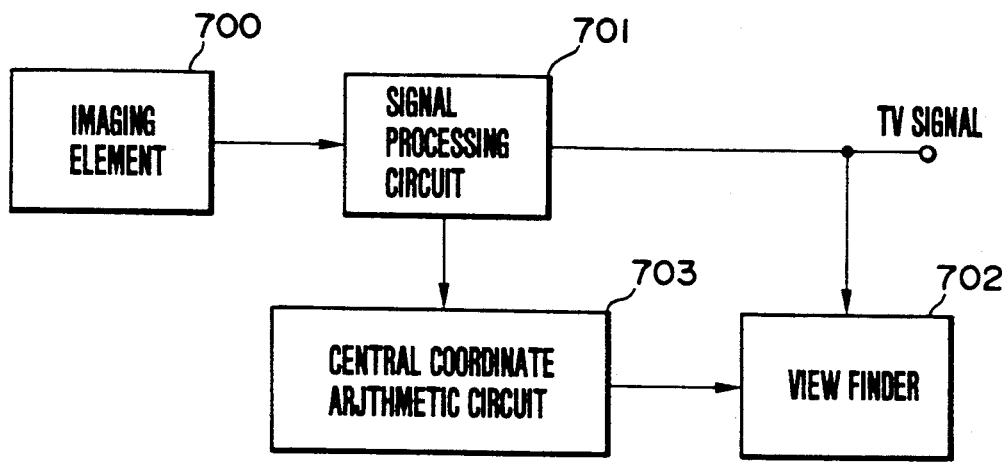
FIGS. 26, 27 and 28 are block diagram showing other embodiments of the present invention, respectively.

FIG. 25 illustrates a further embodiment of the present invention. In FIG. 26, reference numeral 700 denotes an imaging element, 701 a signal processing circuit, 702 a view finder, and 703 a center coordinate arithmetic circuit which calculates coordinates of an optical center in the whole area of the light receiving portion of the imaging element. An image signal of part in the whole area converted into an electric signal version by the imaging element 700 is supplied to the signal processing circuit 701 to be produced as an TV signal and displayed int he view finder 702. Simultaneously, the center coordinate arithmetic circuit 703 calculates the coordinates of the optical center of the whole light receiving portion of the imaging element 700 to display it in the view finder. According to the present invention, the photographer can move the center of the object near a mark of the optical center displayed in the view finder so that the imaging element 700 has extra pixels which are uniform in the vertical and horizontal directions and error in correction of the movement of the hands can be reduced.

Figure 27:
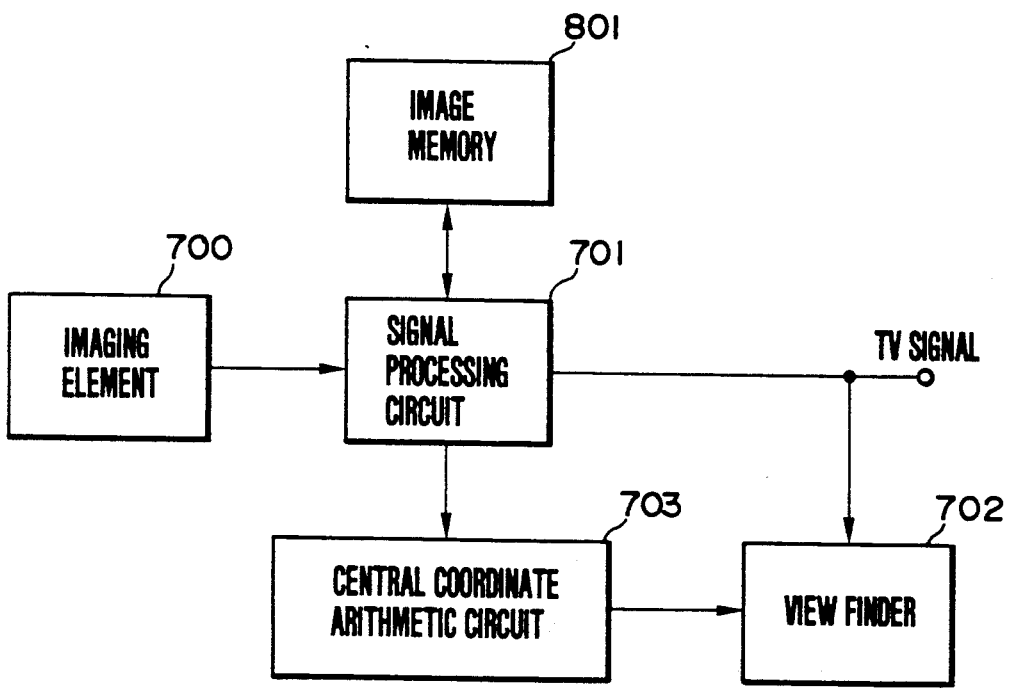

FIG. 27 illustrates a further embodiment of the present invention. In FIG. 27, reference numerals 700 to 703 denote the same elements as those in the embodiment shown in FIG. 26, the numeral 801 denotes an image memory. THe image signal of the whole area converted into an electric signal version by the imaging element 700 is once registered in the image memory 801 through the signal processing circuit 701. Thereafter, part of contents stored in the memory is read out to be produced as a TV signal and displayed in the view finder 702. Simultaneously, the center coordinate arithmetic circuit 703 calculates central coordinates of the whole area of the image memory 801 and displays it in the view finder 702. This embodiment can attain the same effects as the above-mentioned embodiments.

Figure 28:
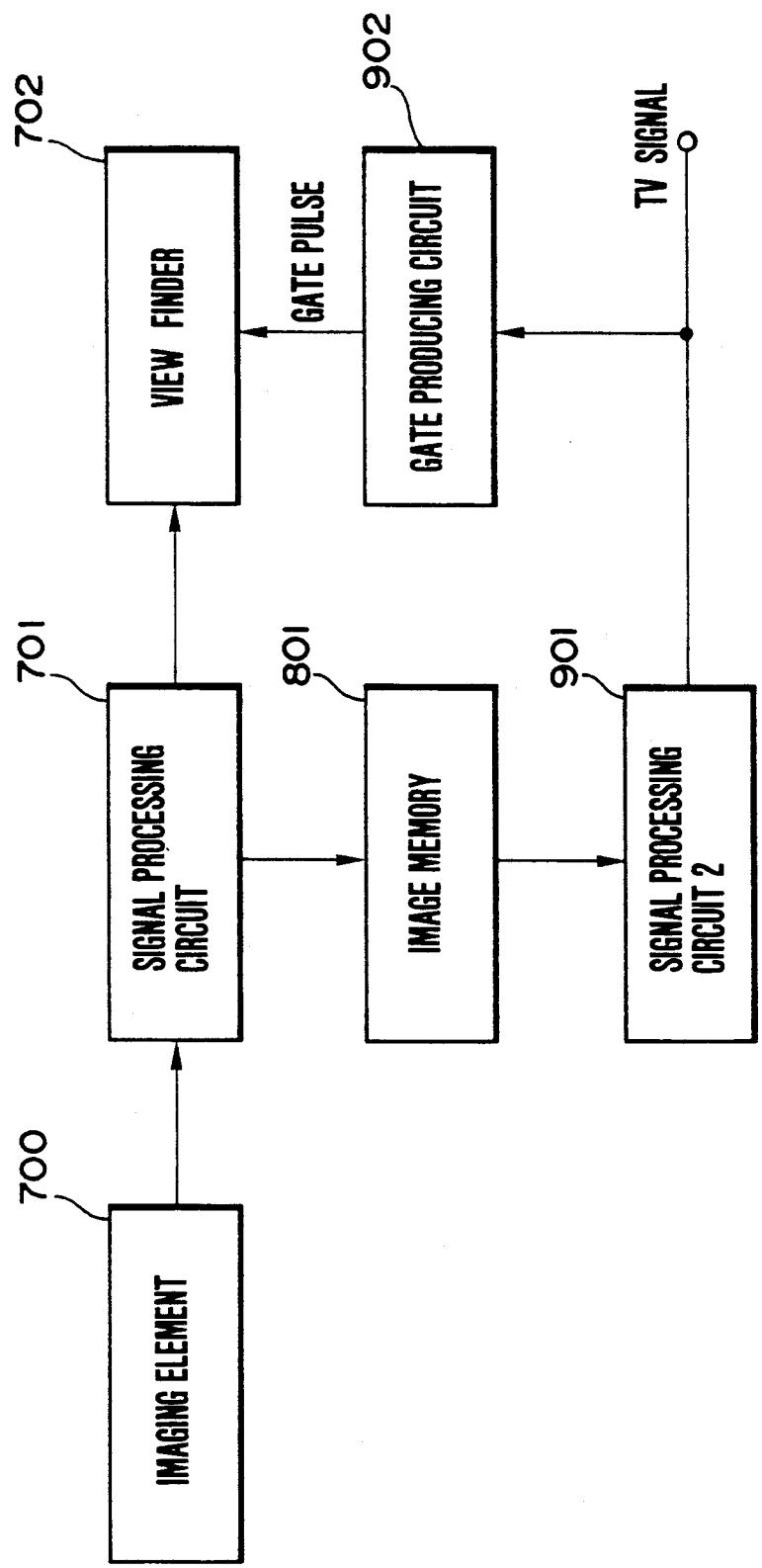

FIG. 28 illustrates a further embodiment of the present invention. In FIG. 28, reference numerals 700 to 703 and 801 denote the same elements as those of the embodiment shown in FIG. 27, numeral 901 denotes a second signal processing circuit different from the signal processing circuit 701 and numeral 902 denotes a gate producing circuit. THe image signal of the whole area converted into an electric signal version by the imaging element 700 is displayed in the view finder 702 through the signal processing circuit 701. Simultaneously, all of the image signal from the signal processing circuit 701 is once stored in the image memory 801 and then part of contents stored in the memory is read out to be produced as the TV signal. THe gate producing circuit 902 produces a gate from the TV signal portion produced from the second signal processing circuit 901 and superposes a gate pulse on the image signal of the whole area in the view finder 702. According to the present invention, the whole area of the imaging element 700 is displayed in the view finder 702 and a boundary line is provided between a portion produced as the TV signal and other portion, or a boundary is provided by changing the brightness therebetween. Accordingly, the photographer can consciously pan and tilt the camera so that the center of the TV signal portion enclosed by the boundary line comes near the center of the view finder. This embodiment can attain the same effects as in the embodiments of FIGS. 26 and 27.

According to the present invention, since the photographer of a camera can recognize which part of the whole area of the imaging element can be produced as the TV signal and can always bring the TV signal portion into the central portion of the whole area of ht imaging element, error int eh correction of movement of the hands is reduced.

We claim:

1. An imaging apparatus comprising:
   an imaging element;
   a signal processing circuit for processing a signal produced from said imaging element to produce an image signal;
   a transfer pulse generating circuit for supplying a transfer pulse for reading out the signal from said imaging element to said imaging element; and
   a scanned pixel area control circuit for supplying a control signal for controlling a scanned pixel area of said imaging element to said transfer pulse generating circuit;
   whereby signals of pixels arranged in said imaging element and adjacent in the vertical direction are read out simultaneously and the scanned pixel area is varied in a pitch of one pixel at a minimum.

2. An imaging apparatus according to claim 1, wherein said transfer pulse generating circuit comprises:
   a normal transfer pulse generating circuit;
   a high-speed transfer pulse generating circuit; and
   a compound circuit for compounding a normal transfer pulse produced from said normal transfer pulse generating circuit and a high-speed transfer pulse produced from said high-speed transfer pulse generating circuit;
   whereby a signal is read out in the scanned pixel area in response to said normal transfer pulse.

3. An imaging apparatus according to claim 1, wherein change of said scanned pixel area or a period of change-over of said transfer pulse is equal to a period of a field or a multiple of the period of the field.

4. An imaging apparatus according to claim 2, wherein change of said scanned pixel area or a period of change-over of said transfer pulse is equal to a period of a field or a multiple of the period of the field.

5. An imaging apparatus according to claim 1, wherein said transfer pulse is changed over during a vertical blanking period.

6. An imaging apparatus according to claim 2, wherein said transfer pulse is changed over during a vertical blanking period.

7. An imaging apparatus according to claim 1, comprising a movement detection circuit for detecting movement of the image signal and means for correcting the movement.

8. An imaging apparatus according to claim 2, comprising a movement detection circuit for detecting movement of the image signal and means for correcting the movement.

9. An imaging apparatus according to claim 1, comprising a counter circuit and means for scrolling an image in the vertical and horizontal directions.

10. An imaging apparatus according to claim 1, comprising a counter circuit and means for scrolling an image in the vertical and horizontal directions.

11. An imaging apparatus according to claim 2, comprising a counter circuit and means for scrolling an image in the vertical and horizontal directions.

12. An image apparatus comprising:
   an imaging element;
   a signal processing circuit for processing a signal produced from said imaging element to produce an image signal;
   a transfer pulse generating circuit for supplying a transfer pulse for reading out the signal from said imaging element to said imaging element; and
   a scanned pixel area control circuit for supplying a control signal for controlling a scanned pixel area of said imaging element to said transfer pulse generating circuit;
   whereby signals of pixels arranged in said imaging element and adjacent in the vertical direction are read out in response to said transfer pulse simultaneously, and when said control signal is not changed said transfer pulse generating circuit produces a transfer pulse for an odd field and a transfer pulse for an even field alternately, while when a predetermined change occurs in said control signal said transfer pulse generating circuit produces a transfer pulse for the odd field or even field successively.

13. An imaging apparatus according to claim 12, wherein said transfer pulse generating circuit comprises:
   a normal transfer pulse generating circuit;
   a high-speed transfer pulse generating circuit; and
   a compound circuit for compounding a normal transfer pulse produced from said normal transfer pulse generating circuit and a high-speed transfer pulse produced from said high-speed transfer pulse generating circuit;
   whereby a signal is read out in the scanned pixel area in response to said normal transfer pulse.

14. An imaging apparatus according to claim 12, wherein change of said scanned pixel area of a period of change-over of said transfer pulse is equal to a period of a field or a multiple of the period of the field.

15. An imaging apparatus according to claim 12, wherein said transfer pulse is changed over during a vertical blanking period.

16. An imaging apparatus according to claim 12, comprising a movement detection circuit for detecting movement of the image signal and means for correcting the movement.

17. An imaging apparatus according to claim 13, comprising a movement detection circuit for detecting movement of the image signal and means for correcting the movement.

18. An imaging apparatus according to claim 13, comprising a counter circuit and means for scrolling an image in the vertical and horizontal directions.

19. A video camera apparatus comprising a solid state imaging element including pixels in the horizontal and vertical directions, memory means for storing a first image signal produced from said solid state imaging element, movement detection means for detecting movement of a camera, control means for controlling a timing of reading out a second image signal rom said memory means by said movement detection means, means for monitoring said first image signal, and image signal recording means, whereby said second image signal is produced in said image signal recording means upon photographing and simultaneously said first image signal is produced in said monitoring means.

20. A video camera apparatus according to claim 19, wherein a ratio of the number of extra pixels provided to accommodate camera movement to the total number of pixels of said solid state imaging element is 30 or more percent.

21. A video camera apparatus including an imaging element, a first signal processing circuit for converting only a certain area of a light receiving area of said imaging element into a TV signal and a view finder for displaying the TV signal produced from said first signal processing circuit, comprising an arithmetic circuit for calculating an optical center of the light receiving plane of said imaging element to display it in said view finder.

22. A video camera apparatus including an imaging element, a first signal processing circuit for converting only a certain area of a light receiving area of said imaging element into a TV signal and a second signal processing circuit provided separately from said first signal processing circuit for converting the whole area of a light receiving plane of said imaging element into a TV signal to display it in a view finder, wherein an area for signal processing in said first signal processing circuit is displayed in said view finder.

* * * * *